United States Patent
Kamatani et al.

(10) Patent No.: US 7,974,831 B2
(45) Date of Patent: Jul. 5, 2011

(54) COMMUNICATION SUPPORT APPARATUS AND COMPUTER PROGRAM PRODUCT FOR SUPPORTING COMMUNICATION BY PERFORMING TRANSLATION BETWEEN LANGUAGES

(75) Inventors: Satoshi Kamatani, Kanagawa (JP); Tetsuro Chino, Kanagawa (JP); Yuka Kuroda, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1520 days.

(21) Appl. No.: 11/368,618

(22) Filed: Mar. 7, 2006

(65) Prior Publication Data

US 2006/0217964 A1    Sep. 28, 2006

(30) Foreign Application Priority Data

Mar. 28, 2005   (JP) .................. 2005-092813

(51) Int. Cl.
*G06F 17/28* (2006.01)

(52) U.S. Cl. .................... 704/4; 704/2; 704/5

(58) Field of Classification Search .......... 704/1–10
See application file for complete search history.

(56) References Cited

U.S. PATENT DOCUMENTS

| 6,154,720 A * | 11/2000 | Onishi et al. .......... 704/2 |
| 7,050,979 B2 * | 5/2006 | Mizutani et al. ......... 704/277 |
| 2003/0097250 A1 | 5/2003 | Chino |
| 2004/0243392 A1 * | 12/2004 | Chino et al. ........... 704/7 |
| 2005/0267734 A1 * | 12/2005 | Masuyama ............ 704/2 |

FOREIGN PATENT DOCUMENTS

| JP | 8-137385 | 5/1996 |
| JP | 2000-200275 | 7/2000 |
| JP | 2003-030187 | 1/2003 |
| JP | 2003-296324 | 10/2003 |

OTHER PUBLICATIONS

U.S. Appl. No. 11/372,030, to Chino et al., filed Mar. 10, 2006, entitled Communication Support Apparatus and Computer Program Product for Supporting Communication by Performing Translation Between Languages.
U.S. Appl. No. 11/370,105, to Kamatani et al., filed Mar. 8, 2006, entitled Communication Support Apparatus and Computer Program Product for Supporting Communication by Performing Translation Between Languages.
Tanaka, "National Language Processing and its Applications", Chapter 11, Section 11.2(3), 3 pages, (1999).
Yoshimura, "Information Science & Engineering T4", 4 pages, (2000).
Nagao et al., "Linguistic Sciences", 7 pages, (1998).

* cited by examiner

*Primary Examiner* — David R Hudspeth
*Assistant Examiner* — Samuel G Neway
(74) *Attorney, Agent, or Firm* — Finnegan, Henderson, Farabow, Garrett & Dunner, L.L.P.

(57) ABSTRACT

A communication supporting apparatus includes a supplemental example storing unit that stores a source language interpretation which is an interpretation of a semantic content of a source language sentence to be translated, and a supplemental example sentence which is an example of a sentence for supporting the semantic content, in association with each other; an input accepting unit that accepts the source language sentence input by a user; an analyzing unit that analyzes the semantic content of the source language sentence and outputs the source language interpretation; a search unit that searches for the supplemental example sentence associated with the source language interpretation from the supplemental example storing unit; and a translation unit that translates the source language sentence and the supplemental example sentence into a target language.

14 Claims, 18 Drawing Sheets

FIG.2

| | |
|---|---|
| 髪を短く切ってください。 | C201 |
| 髪を切ってください。 | C202 |
| 顔を剃ってください。 | C203 |
| シャンプーをしてください。 | C204 |
| スパゲティをお願いします。 | C205 |
| カルボナーラをお願いします。 | C206 |
| その料理には卵がはいっていますか？ | C207 |
| この薬はどうやって飲むのですか？ | C208 |
| 心臓病の治療を受けています。 | C209 |
| 糖尿病の治療を受けています。 | C210 |
| アスピリンを飲んでいます。 | C211 |

FIG.3

211 — ID: 21
212 — TYPE OF SPEECH: REQUEST
213 — ENTRY OF SOURCE SENTENCE: 顔を剃ってください。
214 — ENTRY OF TRANSLATED SENTENCE: A shave,please.
215 — CONDITION: concept:
(request,(motion,<cut,1x000c75>,(subject,<hair,0x006166>)))
201

202
ID:23
TYPE OF SPEECH: REQUEST
ENTRY OF SOURCE SENTENCE: シャンプーをしてください。
ENTRY OF TRANSLATED SENTENCE: A shampoo,please.
CONDITION: concept:
(request,(motion,<cut,1x000c75>,(subject,<hair,0x006166>)))

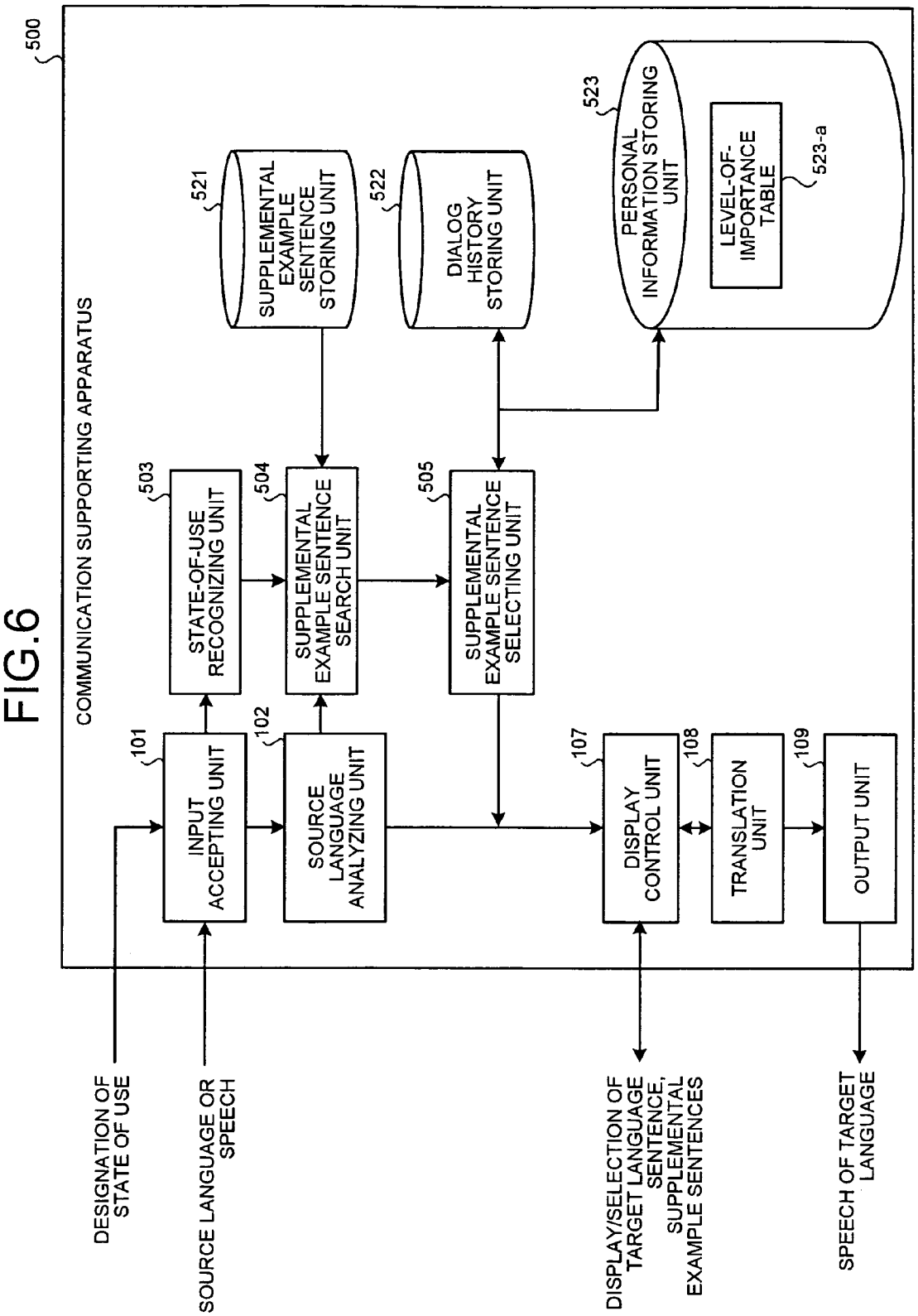

FIG.7

601 — ID: 21
TYPE OF SPEECH: REQUEST
ENTRY OF SOURCE SENTENCE: 顔を剃ってください。
ENTRY OF TRANSLATED SENTENCE: A shave, please.
615 — CONDITION: conditiion: (Place(Barber))
conditiion: (Opportunity(Order))
concept:
(request,(motion,<cut,1x000c75>,(subject,<hair,0x006166>)))
616 — LEVEL OF IMPORTANCE: 3

602 — ID:23
TYPE OF SPEECH: REQUEST
ENTRY OF SOURCE SENTENCE: シャンプーをしてください。
ENTRY OF TRANSLATED SENTENCE: A shampoo, please.
CONDITION: conditiion: (Place(Barber))
conditiion: (Opportunity(Order))
concept:
(request,(motion,<cut,1x000c75>,(subject,<hair,0x006166>)))
LEVEL OF IMPORTANCE: 5

FIG.8

| SPEAKER | JAPANESE | ENGLISH |
|---|---|---|
| OPPONENT | ご注文はお決まりでしょうか？ | May I have your order? |
| YOU | スパゲティをお願いします | Spagetti, please. |
| SYSTEM | その料理には卵は入っていますか？ | Egg is used in that dish? |
| OPPONENT | はい。 | Yes, it is. |

FIG.9

| TYPE OF SPEECH | LEVEL OF IMPORTANCE |
|---|---|
| DISEASE | 10 |
| ORDER | 2 |
| QUANTITY | 0 |
| HOTEL | 1 |

FIG.13

1201
```
ID:10
TYPE OF SPEECH: DISEASE, CONFIRMARTION
ENTRY OF SOURCE SENTENCE:    /1210
その料理には《1.[アレルギー:食品,0x00f00d]》が入っていますか？
ENTRY OF TRANSLATED SENTENCE:《1》is used in this disih?
CONDITION:condition: (Place(Restaurant))
          condition: (Opportunity(Order))   1211
          cocept: (request,(motion,<order,1x0f00ab>,
(subject,<cuisine,0x0ff0a0>)))
LEVEL OF IMPORTANCE: 10
```

1202
```
ID:11
TYPE OF SPEECH: QUANTITY, CONFIRMARTION
ENTRY OF SOURCE SENTENCE : どれくらい量がありますか？
ENTRY OF TRANSLATED SENTENCE : About how big is that dish?
CONDITION: condition: (Place(Restaurant))
           condition: (Opportunity(Order))
           cocept: (request,(motion,<order,1x0f00ab>,
(subject,<spaghetti,0x2ff0a0>)))
LEVEL OF IMPORTANCE: 2
```

1203
```
ID:12
TYPE OF SPEECH: LIKE/DISLIKE, REQUEST
ENTRY OF SOURCE SENTENCE:《1.[嫌い:食品,0x00f00d]》が食べられません。除いてくれますか？
ENTRY OF TRANSLATED SENTENCE: I cannot eat《1》.Would you leave them out?
CONDITION: condition: (Place(Restaurant))
           condition: (Opportunity(Order))
           cocept: (request,(motion,<order,1x0f00ab>,
(subject,<cuisine,0x0ff0a0>)))
LEVEL OF IMPORTANCE: 3
```

FIG.14

| USER FEATURE/<br>FEATURE NAME | USER FEATURE/FEATURE<br>VALUE |
|---|---|
| [NATIONALITY] | •<Japan, 0x860092> |
| [ALLERGY] | •<egg, 0x0ef00d><br>•<tick, 0x126400> |
| [PREVIOUS DISEASE] | •<cardiac disease, 0x0231c3><br>•<diabetes, 0x0f31c3> |
| [CREDIT CARD] | •<Vcard, 0x0ca7d> |
| [HOUSEHOLD MEDICINE] | •<aspirin, 0x5d6a1c> |

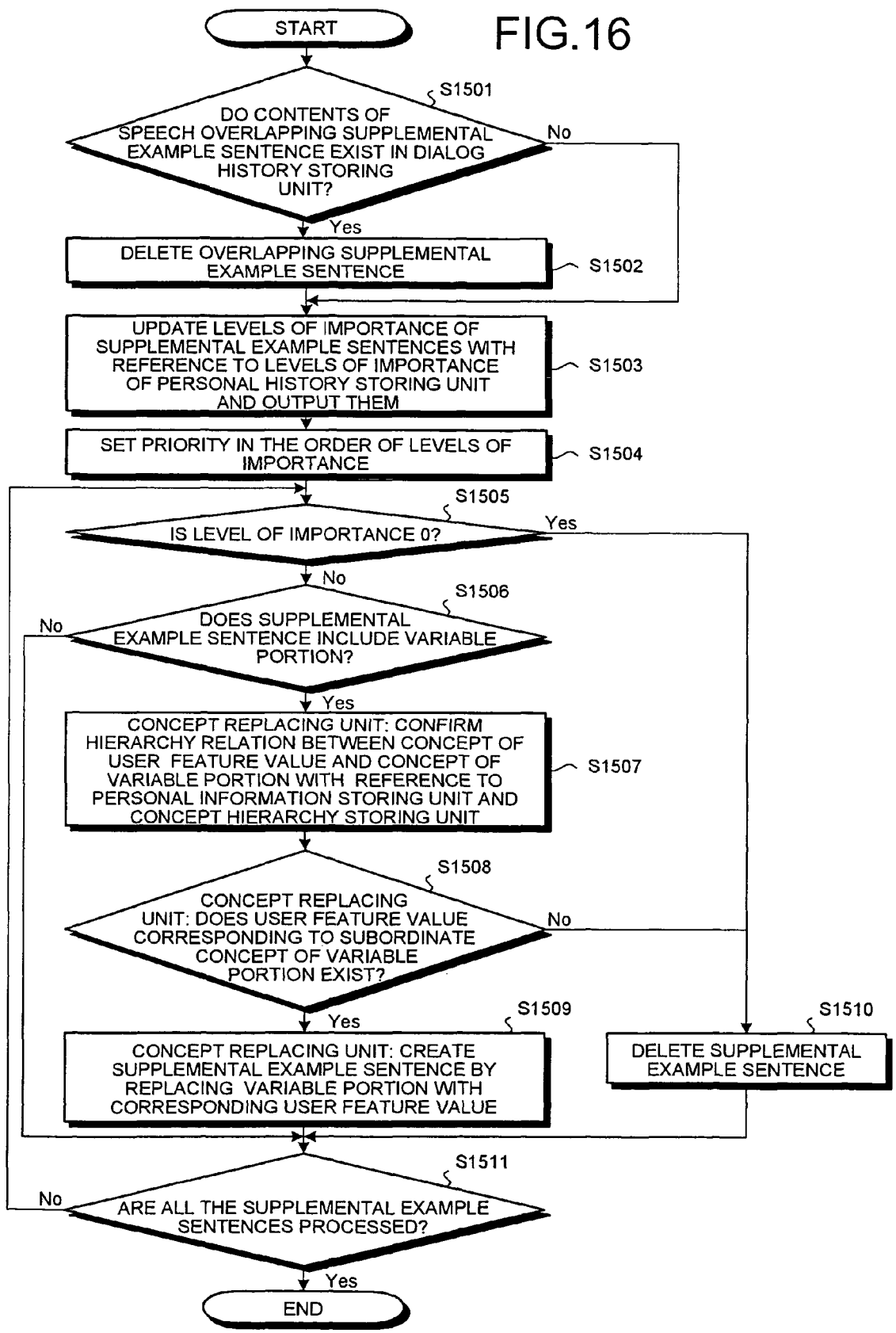

FIG.17

1201
```
ID:10
TYPE OF SPEECH: DISEASE, CONFIRMARTION
ENTRY OF SOURCE SENTENCE:
その料理には《1.[アレルギー:食品,0x00f00d]》が入っていますか?
ENTRY OF TRANSLATED SENTENCE: 《1》is used in this disih?
CONDITION:condition: (Place(Restaurant))
          condition: (Opportunity(Order))
          cocept: (request,(motion,<order,1x0f00ab>,
(subject,<cuisine,0x0ff0a0>)))
LEVEL OF IMPORTANCE: 10
```

1203
```
ID:12
TYPE OF SPEECH: LIKE/DISLIKE, REQUEST
ENTRY OF SOURCE SENTENCE: 《1.[嫌い:食品,0x00f00d]》が食べられません。除いてくれますか?
ENTRY OF TRANSLATED SENTENCE: I cannot eat 《1》.Would you leave them out?
CONDITION: condition: (Place(Restaurant))
           condition: (Opportunity(Order))
           cocept: (request,(motion,<order,1x0f00ab>,
(subject,<cuisine,0x0ff0a0>)))
LEVEL OF IMPORTANCE: 3
```

FIG.18

1701
```
ID:10
TYPE OF SPEECH: LIKE/DISLIKE, REQUEST
ENTRY OF SOURCE SENTENCE: その料理には《1.[卵]》が入っていますか?
ENTRY OF TRANSLATED SENTENCE: 《1》is used in this disih?
CONDITION: condition: (Place(Restaurant))
           condition: (Opportunity(Order))
           concept: (request,(motion,<order,1x0f00ab>,
(subject,<cuisine,0x0ff0a0>)))
LEVEL OF IMPORTANCE: 10
```

FIG.19

1801
```
ID:32
TYPE OF SPEECH: DISEASE
ENTRY OF SOURCE SENTENCE:《1.[既往症:病名,0x0d3ea3]》の治療を受け
ています。
ENTRY OF TRANSLATED SENTENCE: I'm being treated for《1》
CONDITION: condition: (Place(Hospital))
           condition: (Opportunity(symptom-explain))
             cocept: (query,(method,<how,4x001030>,(motion,
<take,1x0d611c>,(subject,(medicine,0x1d6a1c))))
LEVEL OF IMPORTANCE: 9
```

1802
```
ID:35
TYPE OF SPEECH: MEDICINE
ENTRY OF SOURCE SENTENCE:《1.[常備薬:薬,0x0d6a61]》を飲んでいます。
ENTRY OF TRANSLATED SENTENCE: I've taken《1》
CONDITION: condition: (Place(Hospital))
           condition: (Opportunity(symptom-explain))
             cocept: (query,(method,<how,4x001030>,
(motion,<take,1x0d611c>,(subject,(medicine,0x1d6a1c))))
LEVEL OF IMPORTANCE: 9
```

FIG.20

1901
```
ID:32
TYPE OF SPEECH: DISEASE
ENTRY OF SOURCE SENTENCE:《1.心臓病》の治療を受けています。
ENTRY OF TRANSLATED SENTENCE: I'm being treated for《1》
CONDITION: condition: (Place(Hospital))
          condition: (Opportunity(symptom-explain))
          cocept: concept:(query,(method,<how,4x001030>,(motion,
<take,1x0d611c>,(subject,(medicine,0x1d6a1c>)))
LEVEL OF IMPORTANCE: 10
```

1902
```
ID:32
TYPE OF SPEECH: DISEASE
ENTRY OF SOURCE SENTENCE:《1.糖尿病》の治療を受けています。
ENTRY OF TRANSLATED SENTENCE: I'm being treated for《1》
CONDITION: condition: (Place(Hospital))
          condition: (Opportunity(symptom-explain))
          cocept: (query,(method,<how,4x001030>,(motion,
<take,1x0d611c>,(subject,(medicine,0x1d6a1c>)))
LEVEL OF IMPORTANCE: 10
```

1903
```
ID:32
TYPE OF SPEECH: DISEASE
ENTRY OF SOURCE SENTENCE:《1.アスピリン》を飲んでいます。
ENTRY OF TRANSLATED SENTENCE: I've taken《1》
CONDITION: condition: (Place(Hospital))
          condition: (Opportunity(symptom-explain))
          cocept: concept:(query,(method,<how,4x001030>,(motion,
<take,1x0d611c>,(subject,(medicine,0x1d6a1c>)))
LEVEL OF IMPORTANCE: 9
```

COMMUNICATION SUPPORT APPARATUS AND COMPUTER PROGRAM PRODUCT FOR SUPPORTING COMMUNICATION BY PERFORMING TRANSLATION BETWEEN LANGUAGES

CROSS-REFERENCE TO RELATED APPLICATIONS

This application is based upon and claims the benefit of priority from the prior Japanese Patent Application No. 2005-092813, filed on Mar. 28, 2005; the entire contents of which are incorporated herein by reference.

BACKGROUND OF THE INVENTION

1. Field of the Invention

The present invention relates to a communication supporting apparatus, a communication support method, and a computer program product for supporting communication by performing translation between a plurality of languages.

2. Description of the Related Art

Recently, there have been developed automatic translation apparatuses for mechanically translating an arbitrary input sentence due to the development of a natural language processing technology. Apparatuses for translating a sentence described in, for example, Japanese into other language such as English and the like have become commercially practical.

Further, example sentence utilization type translation apparatuses have also become commercially practical which enable speakers to communicate with each other promptly by causing them to select an appropriate sentence from previously prepared example sentences used in ordinary speech or by searching an example sentence similar to speech input by a user and presenting a translated sentence corresponding the example sentence.

As, for example, a foreign language speech supporting apparatus, translation apparatuses such as an electronic dictionary and the like become commercially practical that present paginal translation between a sentence spoken by a user using a native language and a sentence of a target language. Further, there is proposed an automatic translation apparatus (for example, Japanese Patent Application Laid-Open (JP-A) No. 2003-30187) which enables a user to simply select a candidate of speech reflecting the preference and the attribution of the user by storing the history of the contents of speech executed in a study of speech.

In contrast, as a speech processing technology develops, there are practically put into market a speech synthesis system, which converts a character train of a natural language existing as electronic data into a speech output, and a speech input system, which can input a character train of a natural language by causing a user to input a spoken speech and converting the input speech into the character train.

As a result of globalization, since opportunities of communication between different languages increase, there are increased expectations for realization of the automatic translation apparatus and the example sentence utilization type translation apparatuses as described above and a communication supporting apparatus, which makes use of the speech processing technology, to support communications between persons using different languages as native languages.

However, the automatic translation apparatus as described above is disadvantageous in that it is ordinarily very difficult to obtain an accurate result of translation from the apparatus and all the contents intended by a user are not necessarily transmitted correctly.

Accordingly, since consciousness is intensively concentrated to restrict an input of speech contents to enable the automatic translation apparatus to translate the speech contents to accurate expression of a target language which is as near as possible to the intention of the user, thereby the contents originally intended by the user may not be sufficiently transmitted. Further, the user may forget a supplemental matter that the user originally intends to transmit while the user is concentrated to the manipulation of equipment to transmit a minimum matter.

In contrast, in the example sentence utilization type translation apparatus as disclosed in JP-A No. 2003-30187, the example sentences stored in the apparatus is limited and the number of example sentences that can be presented to a user is limited. Thus, the apparatus has a problem in that an example sentence that sufficiently reflects the contents of a speech which the user desires cannot be found and thus the contents that the user originally intends cannot be sufficiently transmitted or the contents which are originally desired to be transmitted cannot be searched.

Even if any of the automatic translation apparatus and the example sentence utilization type translation apparatus is used, since the user tends to concentrate to the transmission of a minimum matter under the environment of communication in a different language, the user tends to pay no attention to add minute conditions to the contents to be transmitted. Further, there is a case in which speech itself may be neglected due to a cultural background and a lack of knowledge and in which the user does not make necessary speech unless its necessity is pointed out because the user is sure, based on common sense, that the contents of it can be naturally understood without it.

SUMMARY OF THE INVENTION

According to one aspect of the present invention, a communication supporting apparatus includes a supplemental example storing unit that stores a source language interpretation which is an interpretation of a semantic content of a source language sentence to be translated, and a supplemental example sentence which is an example of a sentence for supporting the semantic content, in association with each other; an input accepting unit that accepts the source language sentence input by a user; an analyzing unit that analyzes the semantic content of the source language sentence and outputs the source language interpretation; a search unit that searches for the supplemental example sentence associated with the source language interpretation from the supplemental example storing unit; and a translation unit that translates the source language sentence and the supplemental example sentence into a target language.

According to another aspect of the present invention, a communication support method includes accepting a source language sentence input by a user; analyzing a semantic content of a source language sentence to be translated; outputting a source language interpretation as an interpretation of the semantic content of the source language sentence; searching for a supplemental example sentence associated with the source language interpretation, from a supplemental example storing unit that stores the source language interpretation and the supplemental example sentence which is an example of a sentence for supporting the semantic content in association with each other; and translating the source language sentence and the supplemental example sentence into a target language.

According to still another aspect of the present invention, a computer program product has a computer readable medium including programmed instructions for performing a communication support processing. The instructions, when executed by a computer, cause the computer to perform accepting a source language sentence input by a user; analyzing a semantic content of a source language sentence to be translated; outputting a source language interpretation as an interpretation of the semantic content of the source language sentence; searching for a supplemental example sentence associated with the source language interpretation, from a supplemental example storing unit that stores the source language interpretation and the supplemental example sentence which is an example of a sentence for supporting the semantic content in association with each other; and translating the source language sentence and the supplemental example sentence into a target language.

BRIEF DESCRIPTION OF THE DRAWINGS

FIG. 2 is a view explaining an example of data to be processed;

FIG. 3 is a view explaining an example of a data structure of a supplemental example sentence storing unit;

FIG. 6 is a block diagram showing a configuration of a communication supporting apparatus according to a second embodiment;

FIG. 7 is a view explaining an example of a data structure of a supplemental example sentence storing unit;

FIG. 8 is a view explaining an example of a data structure of a dialog history storing unit;

FIG. 9 is a view explaining an example of a data structure of a level-of-importance table;

FIG. 13 is a view explaining an example of a data structure of a supplemental example sentence storing unit;

FIG. 14 is a view explaining an example of a data structure of a user feature table;

FIG. 16 is a flowchart showing an overall flow of supplemental example sentence selection processing in the third embodiment;

FIG. 17 is a view explaining an example of a supplemental example sentence;

FIG. 18 is a view explaining an example of a supplemental example sentence;

FIG. 19 is a view explaining an example of a supplemental example sentence; and

FIG. 20 is a view explaining an example of a supplemental example sentence.

DETAILED DESCRIPTION OF THE INVENTION

Exemplary embodiments of a communication supporting apparatus, a communication support method, and a computer program product according to the present invention will be explained below with reference to the accompanying drawings.

The communication supporting apparatus according to a first embodiment searches supplemental example sentences, which correspond to the semantic content of a source language sentence input by a user, from a storing unit in which the semantic content of the source language sentence and the supplemental example sentences that support the semantic content are stored in correspondence to each other, displays the supplemental example sentences on a screen, and outputs a supplemental example sentence designated by the user on the displayed screen together with the source language sentence after the source language sentence is translated to a target language sentence.

Here, the source language sentence is a character train represented by a source language as a language acting as a source of translation, and the target language sentence is a character train represented by a target language as a language to which the source language is translated. Note that the source language sentence and the target language sentence are not limited to a sentence delimited by a period and may be a sentence, a paragraph, a phrase, a word, and the like. Further, the supplemental example sentence is an example of a sentence for supporting the semantic content of the source language sentence.

The first embodiment explains a communication supporting apparatus for translating Japanese input by a user through speech to English and outputting it through speech as an example. However, a combination of the source language and the target language is not limited thereto, and the method of this proposal can be applied to any combination as long as the source language is translated to a different target language.

Figure 1:
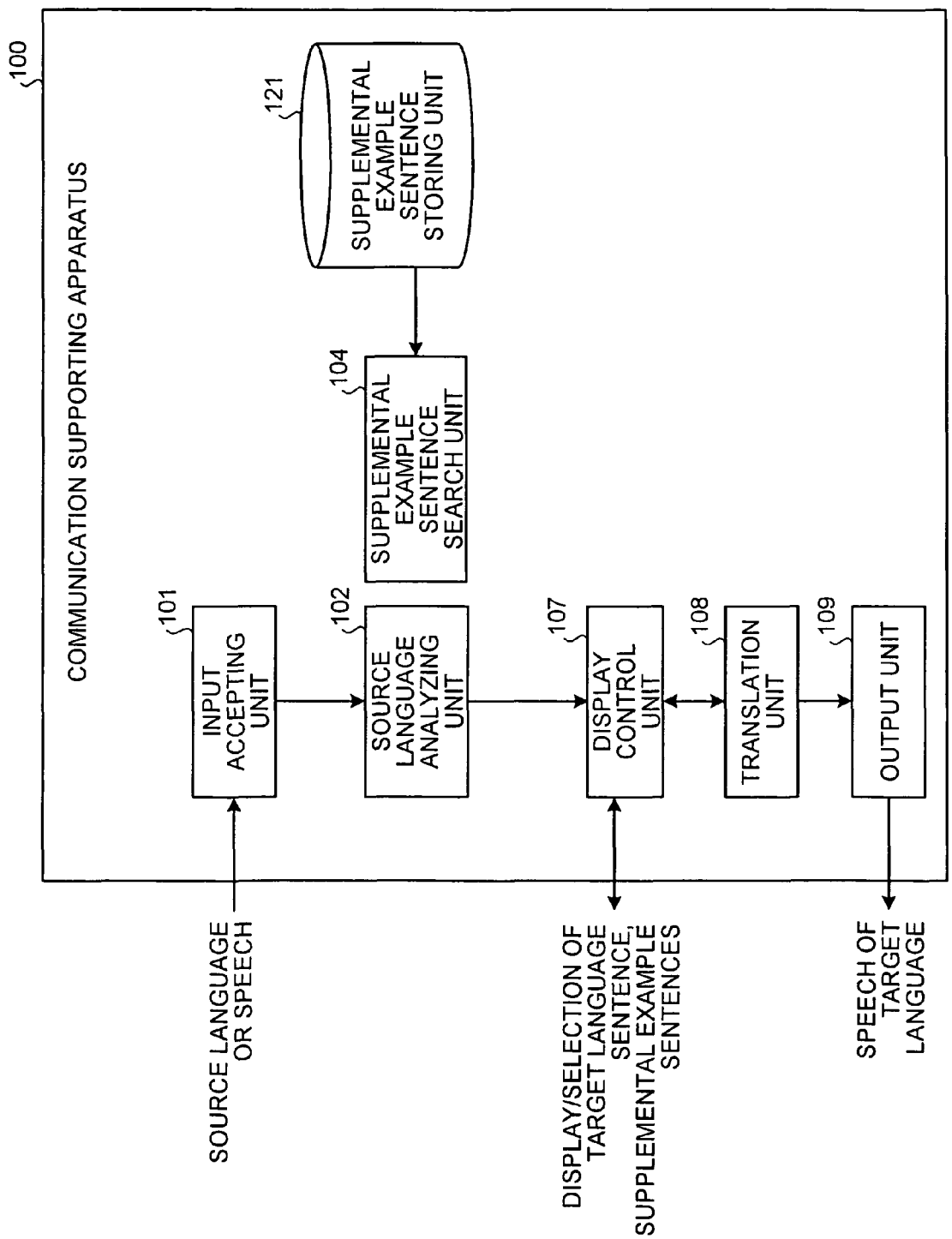
FIG. 1 is a block diagram showing a configuration of a communication supporting apparatus according to a first embodiment.

FIG. 1 is a block diagram showing a configuration of the communication supporting apparatus 100 according to the first embodiment. As shown in FIG. 1, the communication supporting apparatus 100 includes an input accepting unit 101, a source language analyzing unit 102, a supplemental example sentence search unit 104, a display control unit 107, a translation unit 108, an output unit 109, and a supplemental example sentence storing unit 121.

The input accepting unit 101 accepts a source language sentence input by the user. Any ordinary input method using a keyboard, a pointing device, and the like can be applied to input the source language sentence. Further, the input accepting unit 101 may accept a speech input from the user, subject the accepted speech to speech recognition processing, and output a source language sentence.

Any ordinarily used speech recognition method, which employs Linear Predictive Coefficient analysis, Hidden Markov Model (HMM), dynamic programming, neural network, N-Gram language model, and the like, can be applied to the speech recognition processing executed at the time.

The source language analyzing unit 102 subjects the source language sentence accepted by the input accepting unit 101 to natural language analysis processing such as morphological analysis, syntactic analysis, dependency parsing, semantic analysis, context analysis, and the like and outputs a source language interpretation as an interpretation of the semantic content represented by the source language sentence.

Note that any ordinarily used method such as morphological analysis using A*algorithm and syntactic analysis by Earley's method, Chart method, or generalized LR parsing, and the like may be applied to the natural language analysis processing executed by the language analyzing unit 102. Further, a dictionary, which is used to the natural language processing and in which morpheme information, syntactic information, semantic information, and the like are stored, is stored in an ordinarily used storing unit such as an HDD (hard disk drive), an optical disc, a memory card, and the like and referred to in the natural language analysis processing.

An example of a format of the source language interpretation output from the source language analyzing unit 102 is shown by expressions (1) to (3):

$$\text{semantic element}=\text{concept}|\text{semantic relation}|\text{semantic element, semantic element} \quad (1)$$

$$\text{semantic relation}=(\text{semantic role, semantic element}) \quad (2)$$

$$\text{concept}=<\text{entry word, concept symbol}> \quad (3)$$

It is shown here that the elements on the left sides of the respective expressions can be rewritten by the elements of the right sides. Further, it is shown that the elements separated by the symbol "|" can be can be rewritten by any one of them. The entry word is a surface layer character train that appears in a source language sentence, and the concept symbol is an identifier for uniquely identifying a concept. Further, the semantic role shows a semantic relation between concepts in "( )." Further, "," is a symbol showing a breakpoint of two elements and used to show that a semantic element on a right side is rewritten to two elements such as "a semantic element, an semantic element" on a left side.

When, for example, a Japanese sentence C201 of FIG. 2 that means "cut hair short, please" is input as a source language sentence, analysis of the source language sentence results in the following source language interpretation.

(request(level<short, 3x102030>, (motion, <cut, 1x000c75>, (subject, <hair, 0x006166>))))

This means the semantic content of "request" for a motion of <cut, 1x000c75, to (subject(hair, 0x006166> in a level of <short, 3x102030>.

The supplemental example sentence search unit 104 searches a corresponding supplemental example sentence from the supplemental example sentence storing unit 121 using the source language interpretation output from the source language analyzing unit 102 as a search key. A search method will be described later in detail.

The supplemental example sentence storing unit 121 stores a source language interpretation and supplemental example sentences as examples of sentences for supporting the semantic content represented by the source language interpretation in correspondence to each other, and the supplemental example sentence search unit 104 refers to the supplemental example sentence storing unit 121 when it searches supplemental example sentences corresponding to a source language interpretation output from the source language analyzing unit 102. The supplemental example sentence storing unit 121 can be composed of any ordinary used storing unit such as an HDD, an optical disc, a memory card, and the like.

FIG. 3 is a view explaining an example of a data structure of the supplemental example sentence storing unit 121. As shown in FIG. 3, the supplemental example sentence storing unit 121 stores ID, a type of speech, the entry of a source sentence, the entry of a translated sentence, and a condition in correspondence to each other. In addition to the above-mentioned, the supplemental example sentence storing unit 121 may further store explanatory sentences that show the contents and effects of supplement in correspondence to the supplemental example sentences.

The ID 211 is an identification number for uniquely identifying a supplemental example sentence. Further, the type of speech 212 is a breakpoint for classifying the contents of speech of a supplemental example sentence, and, for example, "disease," "order," "quantity," "hotel," and the like are set as it. However, the type of speech is not limited to those described above and any breakpoint can be used as the type of speech as long as it classifies the contents of speech of a supplemental example sentence. In FIG. 3, "request" is set as the type of speech, which shows that the supplemental example describes contents for requesting something to a dialog opponent.

The entry of a source sentence 213 shows a supplemental example sentence described in a source language, and the entry of a translated sentence 214 shows a supplemental example sentence described in a target language. The condition 215 shows a condition for searching supplemental example sentences and is composed of a "concept" portion for prescribing a condition as to a source language interpretation. The format of the "concept" portion is the same as that of the source language interpretation described above and can make respective items to correspond to each other. That is, when a source language interpretation output from the source language analyzing unit 102 agrees with the format described in the condition 215, supplemental example sentences including the condition are searched by the supplemental example sentence search unit 104.

Note that a supplemental example sentence may be searched not only when the format thereof completely agrees with a source language interpretation but also when it is partly agrees therewith. As shown in, for example, FIG. 3, when the source language interpretation is "(request(level, <short, 3x102030>, (motion, <cut, 1x000c75>, (subject, <hair, 0x006166>))))," supplemental example sentences may be searched using "(request(motion, <cut, 1x000c75>, (subject, <hair, 0x006166>))", excluding a semantic element showing a level as a search key. In this case, the supplemental example sentence 201 and a supplemental example sentence 202 identified by ID=21 and ID=23 in FIG. 3 are searched.

Note that the condition 215 can designate a symbol '*' as the semantic element. When the symbol '*' is designated, agreement with the source language interpretation is determined by replacing '*' with an arbitrary semantic element.

The display control unit 107 presents the supplemental example sentence searched by the supplemental example sentence search unit 104 to the user on a supplemental example sentence display screen. At the time, it may be displayed together with an input source language sentence and further may be displayed together with a target language sentence as a result of translation executed by the translation unit 108. Further, the supplemental example sentence display screen may have a function for causing the user to designate a supplemental example sentence that is used by him or her from a plurality of supplemental example sentences and a function for causing the user to designate a supplemental example sentence that is not used by him or her. In addition to the above-mentioned, the supplemental example sentence display screen may display a sentence explaining the contents and effects of supplement. The supplemental example sentence display screen will be described later in detail.

The translation unit 108 translates a source language sentence represented by Japanese to a target language sentence represented by English. Note that any translation system used in a machine translation system such as an ordinary transfer system, an example base system, a statistic base system, and an intermediate language system can be applied the translation processing executed by the translation unit 108.

The output unit 109 receives the target language sentence translated by the translation unit 108 and the translated sentence of a supplemental example sentence and outputs the contents thereof as a synthesized speech of English as a target language. Any ordinary used method such as speech synthesis by editing voice pieces, formant speech synthesis, text to speech synthesis, and the like can be applied to the speech synthesis processing executed by the output unit 109.

Note that it may be omitted to output a speech by the output unit 109. That is, in place of inputting a speech through the input accepting unit 101 and outputting a speech from the output unit 109, a source language text may be input by an input unit such as a keyboard, a pointing device, and the like, and a target language text may be output through a display unit such as a display on which the text is displayed.

Figure 4:
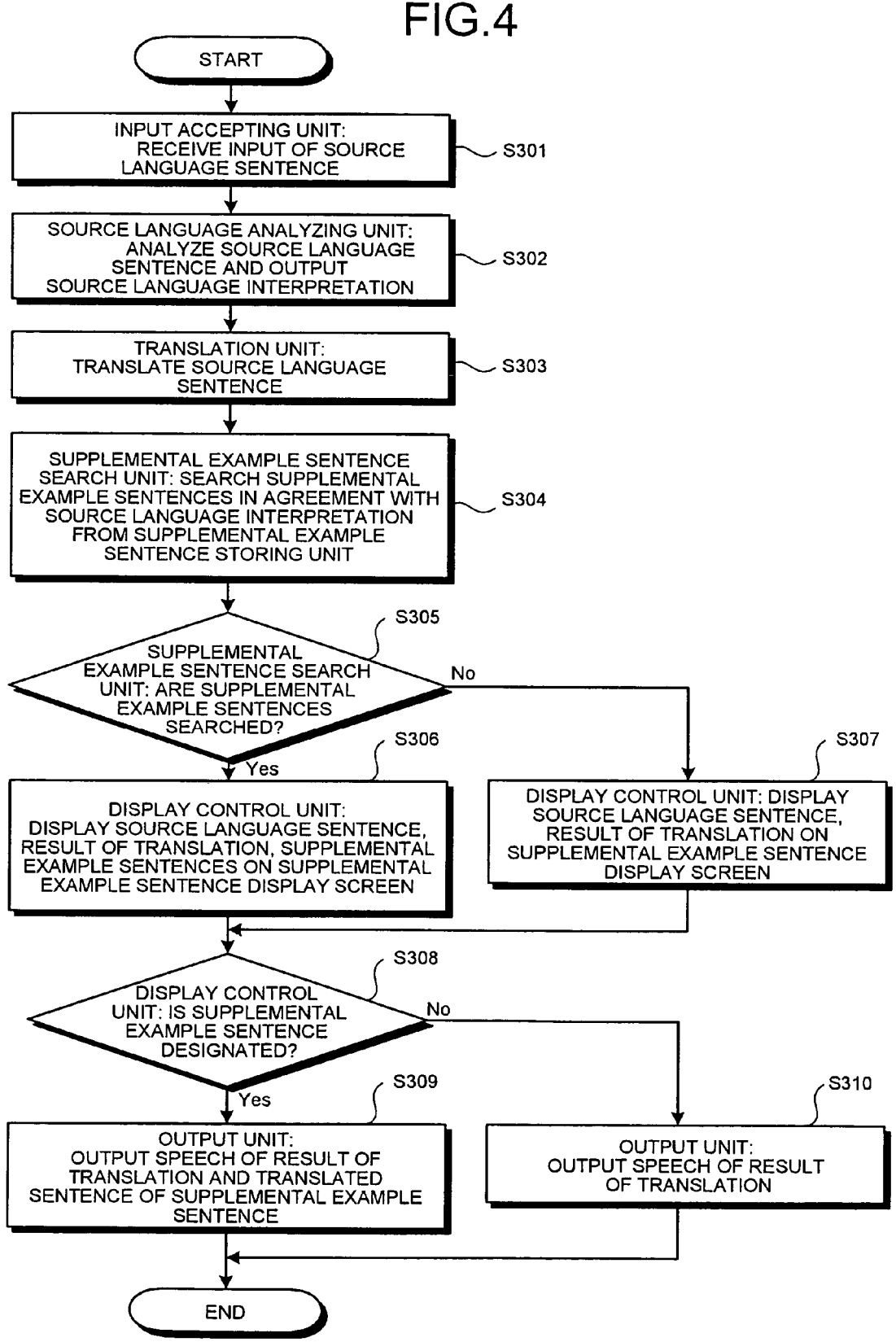
FIG. 4 is a flowchart showing an overall flow of communication support processing in the first embodiment.

Next, communication support processing executed by the communication supporting apparatus 100 according to the first embodiment configured as described above will be explained. FIG. 4 is a flowchart showing an overall flow of the communication support processing in the first embodiment.

First, the input accepting unit 101 accepts a source language sentence input by the user (step S301). As described above, the input accepting unit 101 may accept a speech input by the user and obtain a source language sentence by subjecting the speech to speech recognition processing.

Next, the source language analyzing unit 102 analyzes the source language sentence accepted by the input accepting unit 101 and outputs a source language interpretation (step S302). Specifically, ordinary natural language analysis processing such as morphological analysis, syntactic analysis, semantic analysis, context analysis, and the like is executed to the source language sentence, and a source language interpretation is output by describing respective morphemes, which are obtained as a result of the processing, a relation between the respective morphemes in the format.

Next, the translation unit 108 translates the source language sentence accepted by the input accepting unit 101 to a target language sentence and outputs the target language sentence (step S303). Note that since the target language sentence is necessary so that it is displayed on the supplemental example sentence display screen, the translation processing may be executed by the translation unit 108 at any time as long as it is executed until the supplemental example sentence display screen is displayed at step S306 or S307.

Next, the supplemental example sentence search unit 104 searches supplemental example sentences having the "concept" portion whose condition agrees with the source language interpretation from the supplemental example sentence storing unit 121 using a language analysis output from the language analyzing unit 102 as a search key (step S304).

Next, the supplemental example sentence search unit 104 determines whether or not the supplemental example sentences are searched (step S305). When the supplemental example sentences are searched (step S305: YES), the display control unit 107 displays the source language sentence, the result of translation of the source language sentence, and the supplemental example sentence on the supplemental example sentence display screen (step S306). When the supplemental example sentences are not searched (step S305: NO), the display control unit 107 displays the source language sentence, and the result of translation of the source language sentence on the supplemental example sentence display screen (step S307).

Figure 5:
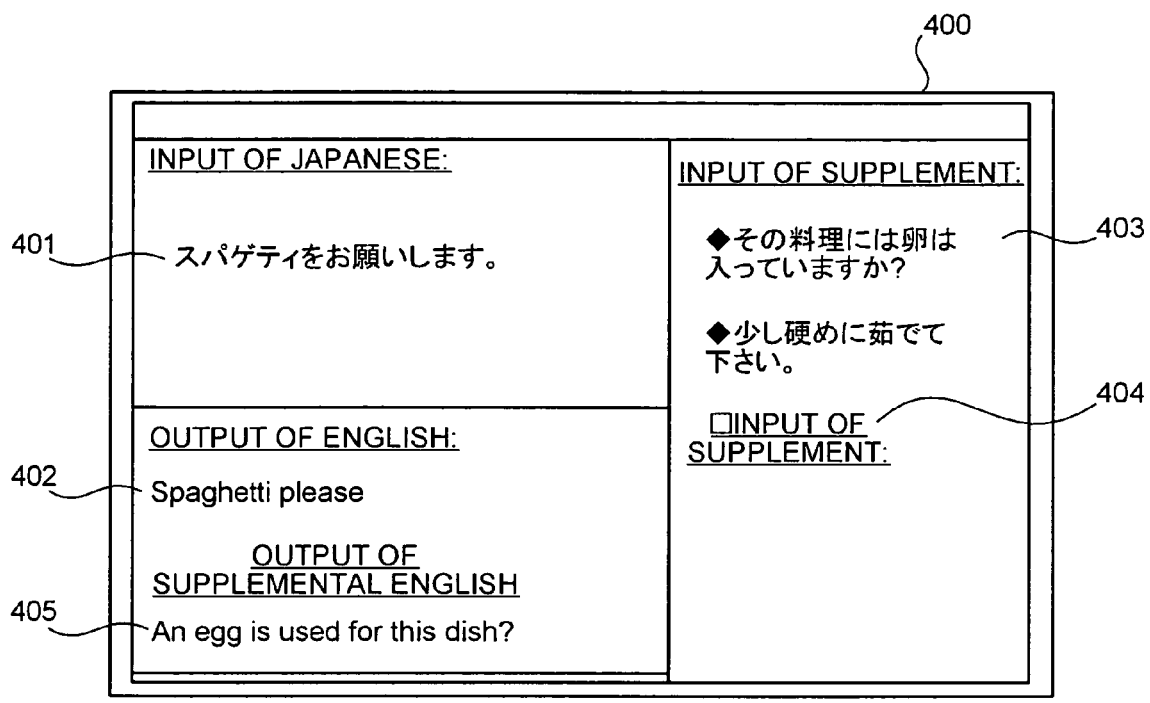
FIG. 5 is a schematic view showing the contents of a supplemental example sentence display screen.

FIG. 5 is a schematic view showing the contents of the supplemental example sentence display screen. As shown in FIG. 5, the supplemental example sentence display screen 400 displays an Japanese input 401, which is an input sentence of Japanese as a source language, an English output 402 as a result of translation of the input language to English as a target language, input supplements 403, which are candidates of supplemental example sentences, a non-supplement check box 404, which is designated when the supplemental example sentence is not used, and a supplement English output 405, which is the entry of the translated sentence of a designated supplemental example sentence.

The user using the keyboard, or the pointing device, or the like may designate any one of the input supplements 403. In this case, the entry of the translated sentence of the supplemental example sentence designated by the user is output to the supplement English output 405. When the non-supplement check box 404 is depressed, the supplement English output 405 is left as a blank column.

Note that the user may correct the supplemental example sentence displayed to the input supplements 403. Accordingly, the intention of the user can be more properly transmitted.

After the supplemental example sentence display screen is displayed at step S306 or S307, the display control unit 107 determines whether or not a supplemental example sentence is designated on the screen (step S308). When the supplemental example sentence is designated (step S308: Yes), the output unit 109 outputs a target language sentence as a result of translation of the source language sentence and the translated sentence of the supplemental example sentence in a speech of English as the target language (step S309), thereby the communication support processing is ended.

When the supplemental example sentence is not designated (step S308: No), the output unit 109 outputs only the target language sentence as the result of translation of the source language sentence in the speech of English as the target language (step S310), thereby the communication support processing is ended.

Next, a specific example of the communication support processing of the first embodiment will be explained. It is assumed here that supplemental example sentences as shown in FIG. 3 is registered in the supplemental example sentence storing unit 121.

First, when the user inputs a Japanese sentence C202 of FIG. 2 that means "A haircut, please." as a source language sentence, the input accepting unit 101 accepts the input of the source language sentence (step S301). Next, the source language analyzing unit 102 analyzes the source language sentence and outputs (request, (motion, <cut, 1x000c75>, (subject, <hair, 0x006166>))) as a source language interpretation as a result of analysis of the source language (step S302).

The translation unit 108 outputs "A haircut, please." as a target language sentence as a result of translation of the source language sentence (step S303). Further, the supplemental example sentence search unit 104 searches supplemental example sentences having a condition that agrees with the source language interpretation (request, (motion, <cut, 1x000c75>, (subject, <hair, 0x006166>))) from the supplemental example sentence storing unit 121 (step S304). As a result, supplemental example sentences 201 and 202 shown in FIG. 3 are searched.

Since the supplemental example sentences are searched (step S305: Yes), the display control unit 107 displays the Japanese sentence C202 as the source language sentence, the result of translation "A haircut, please." and supplemental example sentences C203 and C204 of FIG. 2, which correspond to the entries of the source sentence columns of the supplemental example sentences 201 and 202, on the supplemental example sentence display screen (step S306).

When the supplemental example sentence C204 is designated on the supplemental example sentence display screen as a supplemental example sentence used by the user (S308), the output unit 109 synthesizes the target language sentence "A haircut, please.," which is translated by the translation unit 108, and the entry of a translated sentence "A shampoo, please." of the supplemental example sentence, which is stored in the supplemental example sentence storing unit 121, to a speech of English as the target language and outputs a result of synthesis (step S309).

As described above, the communication supporting apparatus 100 according to the first embodiment can search the supplemental example sentences, which correspond to the semantic content of a source language sentence input by the user, from the storing unit in which the semantic content of the source language sentence and the supplemental example sentences that support the semantic content are stored in correspondence to each other, can display the supplemental example sentences on the screen, and can output the supplemental example sentence designated by the user on the displayed screen together with the source language sentence after they are translated. Accordingly, not only a minimum matter can be transmitted but also a supplemental matter and a matter that cannot be transmitted due to a lack of knowledge as to cultural backgrounds and customs can be properly transmitted.

A communication supporting apparatus according to a second embodiment includes storing units for storing a level of importance, which shows a level of interest of a user to speech contents, and the dialog history of the user. Therefore, the user searches supplemental example sentences according to a state in which the user speaks as well as selects the searched supplemental example sentences according to the level of importance and the dialog history.

FIG. 6 is a block diagram showing a configuration of a communication supporting apparatus 500 of the second embodiment. As shown in FIG. 6, the communication supporting apparatus 500 includes an input accepting unit 101, an language analyzing unit 102, a state-of-use recognizing unit 503, a supplemental example sentence search unit 504, a supplemental example sentence selecting unit 505, a display control unit 107, a translation unit 108, an output unit 109, a supplemental example sentence storing unit 521, a dialog history storing unit 522, and a personal information storing unit 523.

The second embodiment is different from the first embodiment in that the state-of-use recognizing unit 503, the supplemental example sentence selecting unit 505, the dialog history storing unit 522, and the personal information storing unit 523 are added and that the functions of the supplemental example sentence selecting unit 505 and the data structure of the supplemental example sentence storing unit 521 are different from those of the first embodiment. Since the other configurations and functions of the second embodiments are the same as those shown in the block diagram of FIG. 1 showing the configuration of the communication supporting apparatus 100 according to the first embodiment, the same components are denoted by the same reference numerals and the explanation thereof is not repeated.

The state-of-use recognizing unit 503 is used by a user to recognize a state of use that is input through a speech recognizing unit, a keyboard, a pointing device, and the like. The state of use is information showing a state of a dialog made by the user and includes, for example, a place, a time, and a scene in and at which the dialog is executed. Note that the state of use is not limited thereto, and any information showing a state of a dialog made by the use corresponds to the state of use.

Note that the state-of-use recognizing unit 503 may recognize the state of use (place in which dialog is executed) by obtaining the position information of a place in use by a GPS receiving function and RFID (Radio Frequency Identification). Further, the state-of-use recognizing unit 503 may recognize a present state of use from the contents of speech in the past or the contents of speech made just before.

The state-of-use recognizing unit 503 stores a recognized state of use in a storing unit that is used ordinarily such as an HDD, an optical disc, a memory card, and the like. When, for example, a place is a "restaurant," and a scene is an "order," the former is stored as "Place (Restaurant)," and the latter is stored as "Opportunity (Order)." That is, a type of the state of use and the specific contents of the state of use are stored in correspondence to each other. The stored state of use is referred to when the supplemental example sentence search unit 504 searches supplemental example sentences whose state of use agrees with the state of use later from the supplemental example sentence storing unit 521.

The supplemental example sentence search unit 504 searches corresponding supplemental example sentences from the supplemental example sentence storing unit 521 using a source language interpretation output from the source language analyzing unit 102 and a state of use recognized by the state-of-use recognizing unit 503 as search keys. A search method will be described later in detail.

The supplemental example sentence storing unit 521 stores a source language interpretation, a condition of use, and supplemental example sentences as examples of sentences for supporting the semantic content represented by the source language interpretation in correspondence to each other. The supplemental example sentence storing unit 521 is referred to when the supplemental example sentence search unit 504 searches a supplemental example sentence which corresponds to the state of use recognized by the state-of-use recognizing unit 503 and to the source language interpretation that is output from the source language analyzing unit 102.

FIG. 7 is a view explaining an example of a data structure of the supplemental example sentence storing unit 521. As shown in FIG. 7, the supplemental example sentence storing unit 521 of the second embodiment is different from the supplemental example sentence storing unit 121 of the first embodiment in that "condition" portions that show a state of use are added to a condition 615 and further a level of importance 616 is added.

The "condition" portions of the condition 615 describe states of use to which a supplemental example sentence is applied in the same format as a state of use recognized by the state of use recognizing unit 503. FIG. 7 shows an example of description of the "condition" portions when, for example, a place is a barber (Place (Barber)) and a scene of dialog is an order (Opportunity (Order)). The example shows that supplemental example sentences 601 and 602 are searched in the state of use in which the order is made in the barber.

The level of importance 616 describes a level of importance as a value showing the level of importance of a supplemental example sentence. Here, the level of importance is represented in correspondence to integer values from 1 to 10, and a larger value shows a higher level of importance.

The dialog history storing unit 522 stores a dialog history as a history of speech made by the user himself or herself and can be composed of any storing unit that is used ordinarily such as an HDD, an optical disc, a memory card, and the like. Note that the dialog history storing unit 522 may store a history of speech of a dialog opponent. In this case, the state of use recognizing unit 503 may recognize a present state of use from the contents of speech of the dialog opponent.

As described above, the dialog history storing unit 522 is referred to when the state-of-use recognizing unit 503 recognizes a state of use from a past dialog history or when the supplemental example sentence selecting unit 505 to be described later deletes an already spoken supplemental example sentence.

FIG. 8 is a view explaining an example of a data structure of the dialog history storing unit 522. As shown in FIG. 8, the dialog history storing unit 522 stores speakers 701, Japanese sentences 702 as a sentence written by the source language, and English sentences 703 as a sentence written by the target language in correspondence to each other. The speakers 701 stores types of speakers and shows that "you" is spoken by the user, an "opponent" is spoken by a dialog opponent, and a "system" is a supplemental speech made by the apparatus of the user.

The personal information storing unit 523 stores personal information as information regarding the user. The personal information storing unit 523 stores the levels of importance, which show the levels of interest of the user to the respective types of speech, in a level-of-importance table 523-*a*. The level-of-importance table 523-*a* is referred to so that the supplemental example sentence selecting unit 505 updates the levels of importance of supplemental example sentences, which are searched from the supplemental example sentence storing unit 521, according to the levels of importance set to respective individuals.

FIG. 9 is a view explaining an example of a data structure of the level-of-importance table 523-*a*. As shown in FIG. 9, the level-of-importance table 523-*a* stores a type of speech 801 and a level of importance 802 in correspondence to each other. The type of speech 801 shows a breakpoint for classifying the contents of speech likewise the supplemental example sentence storing unit 521. Further, the level of importance 802 is shown in correspondence to integer values from 1 to 10 likewise the level of importance stored in the supplemental example sentence storing unit 521, and a larger integer value shows a higher level of importance.

In the example shown in FIG. 9, the user sets the level of importance for the type of speech "disease" to 10, which shows that the user is most interested in the "disease." Further, the user sets the level of importance for the type of speech "quantity" to 0, which shows that the user is not interested in the "quantity."

The supplemental example sentence selecting unit 505 refers to the level of importance stored in the level-of-importance table 523-*a* and to the dialog history stored in the dialog history storing unit 522 and selects a supplemental example sentence according to the level of importance and the dialog history from the supplemental example sentences searched by the supplemental example sentence search unit 504.

Specifically, the supplemental example sentence selecting unit 505 deletes the supplemental example sentence which is already spoken during a present dialog from the supplemental example sentences searched by the supplemental example sentence search unit 504 with reference to the dialog history storing unit 522. Further, the supplemental example sentence selecting unit 505 refers to the level-of-importance table 523-*a* and updates the levels of importance of the searched supplemental example sentence according to the levels of importance of respective individuals stored in the level-of-importance table 523-*a*. At the time, the supplemental example sentences whose level of importance is set to 0 are deleted. Accordingly, there can be reduced a possibility of occurrence of a problem in that the user cannot designate a proper supplemental example sentence because unnecessary supplemental example sentences are presented and thus the contents intended by the user cannot be sufficiently transmitted.

Further, since a plurality of types of speech are set, when a plurality of values exist in the levels of importance of the respective individuals, the levels of importance are updated according to the level of importance having a largest value. When the levels of importance of the respective individuals are not set to the level-of-importance table 523-*a*, the values of the levels of importance stored in the supplemental example sentence storing unit 521 are used as they are.

Note that the supplemental example sentence selecting unit 505 may set priority to the supplemental example sentences in the order of the thus obtained levels of importance as well as the display control unit 107 may present the supplemental example sentences to the user according to the priority. Further, the supplemental example sentence selecting unit 505 may select the predetermine number of supplemental example sentences, thereby a supplemental example sentence can be easily displayed and the user can easily designate a supplemental example sentence even if a display region is limited.

Figure 10:
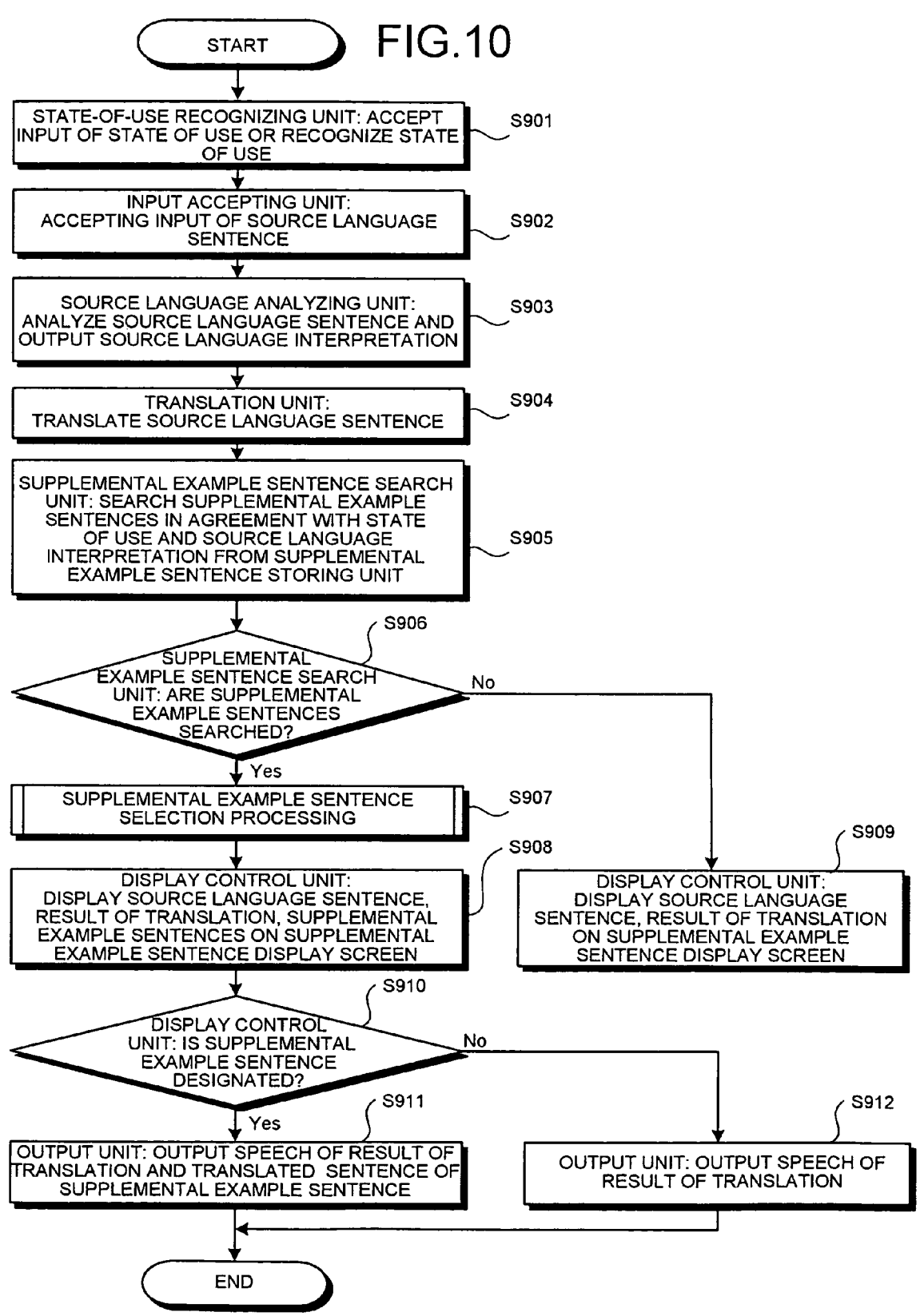
FIG. 10 is a flowchart showing an overall flow of communication support processing in the second embodiment.

Next, communication support processing executed by the communication supporting apparatus 500 according to the second embodiment configured as described above will be explained. FIG. 10 is a flowchart showing an overall flow of the communication support processing in the second embodiment.

First, the state-of-use recognizing unit 503 receives a state of use input by the user or recognizes a state of use by obtaining position information (step S901).

Since source language input analysis processing, translation processing, and supplemental example sentence search processing from steps S902 to S906 are the same as those from steps S301 to S305 in the communication supporting apparatus 100 of the first embodiment, the explanation thereof is not repeated.

After the supplemental example sentence search unit 504 searches supplemental example sentences at step S906, the supplemental example sentence selecting unit 505 executes supplemental example sentence selection processing (step S907). The supplemental example sentence selection processing will be described in detail later.

After the supplemental example sentence selection processing is executed, since supplemental example sentence display screen display processing and speech output processing from steps S908 to S912 are the same as those from steps S306 to 310 in the in the communication supporting apparatus 100 of the first embodiment, the explanation thereof is not repeated.

Figure 11:
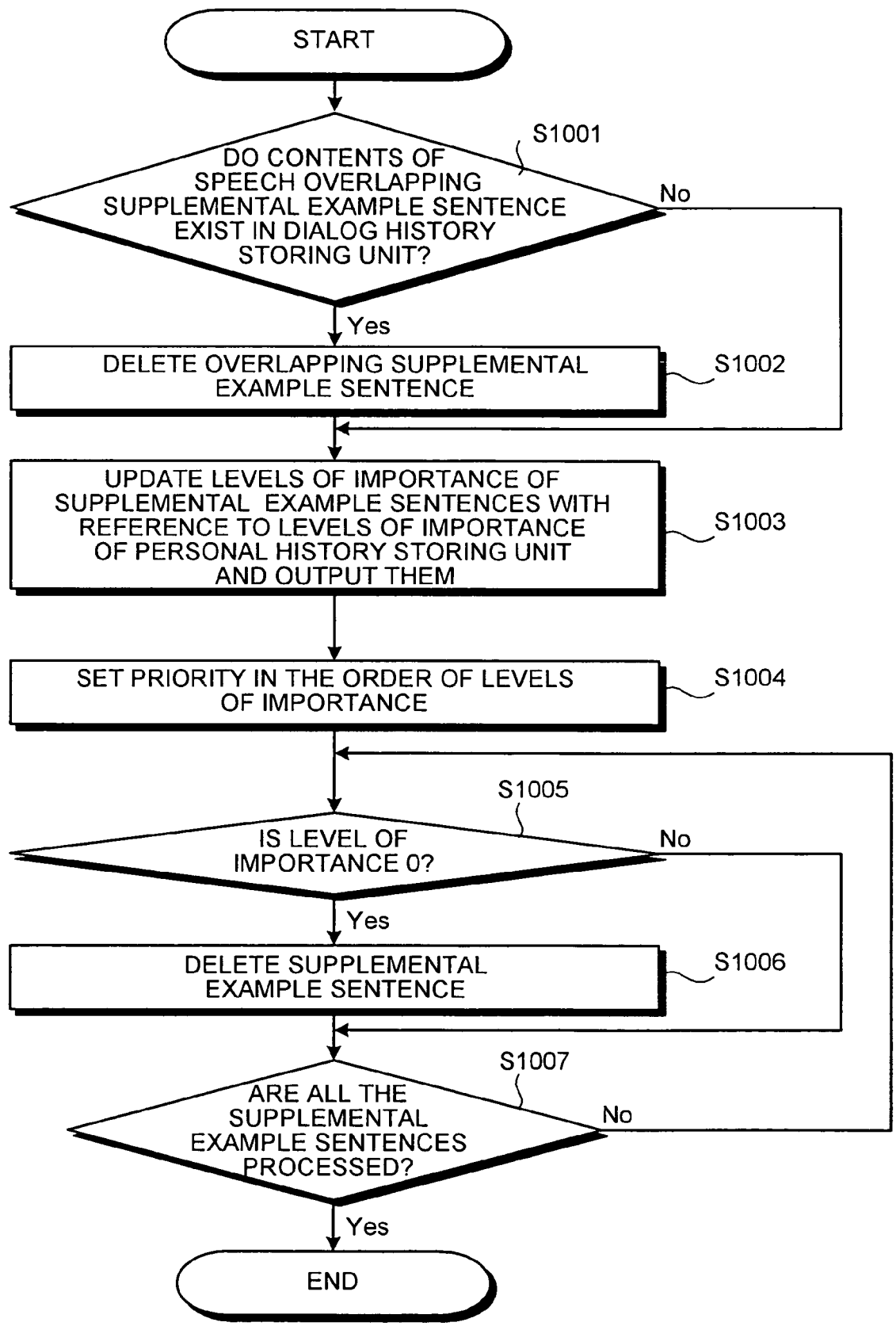
FIG. 11 is a flowchart showing an overall flow of supplemental example sentence selection processing in the second embodiment.

Next, the supplemental example sentence selection processing shown at step S907 will be explained in detail. FIG. 11 is a flowchart showing an overall flow of the supplemental example sentence selection processing in the second embodiment.

First, the supplemental example sentence selecting unit 505 determines whether or not there are the contents of speech overlapping the supplemental example sentences with reference to the dialog history storing unit 522 (step S1001). When there are the overlapping contents of speech (step S1001: Yes), the supplemental example sentence selecting unit 505 deletes the overlapping supplemental example sentences (step S1002). This is to avoid to further output the already spoken supplemental example sentences.

When there are not the overlapping contents of speech (step S1001: No) or after the overlapping supplemental example sentences are deleted, the supplemental example sentence selecting unit 505 updates the levels of importance of the supplemental example sentences with reference to the levels of importance stored in the level-of-importance table 523-*a* of the personal information storing unit 523 (step S1003).

Specifically, the corresponding levels of importance of the level-of-importance table 523-*a* are searched using the types of speech in the supplemental example sentences as a search key, and when the levels of importance are searched, the levels of importance in the supplemental example sentences are updated according to the searched levels of importance. When the levels of importance are not searched, the levels of importance in the supplemental example sentences are not updated and previously set values are used as they are.

Next, the supplemental example sentence selecting unit 505 sets priority to the supplemental example sentences in the order of the levels of importance thereof (step S1004), thereby the display control unit 107 can display the supplemental example sentences in the order of the levels of importance of the supplemental example sentences according to the priority.

Next, the supplemental example sentence selecting unit 505 determines whether or not the levels of importance of the supplemental example sentences are 0 (step S1005) and deletes supplemental example sentences whose level of importance is 0 (step S1006: Yes), thereby it is possible to display no supplemental example sentence corresponding to a type of speech in which the user is not interested.

When the levels of importance of the supplemental example sentences are not 0 (step S1005: No), the supplemental example sentence selecting unit 505 determines whether or not all the supplemental example sentences are processed (step S1007), and when all the supplemental example sentences are not processed (step S1007: No), the process returns to the level of importance determination processing and repeats it (step S1005). When all the supplemental example sentences are processed (step S1007: Yes), the supplemental example sentence selection processing is ended.

Next, a specific example of the communication support processing of the second embodiment will be explained. It is assumed here that the supplemental example sentences 601 and 602 as shown in FIG. 7 are registered in the supplemental example sentence storing unit 521, the dialog history as shown in FIG. 8 is registered in the dialog history storing unit 522, and the levels of importance as shown in FIG. 9 are registered in the level-of-importance table 523-*a*.

First, the user inputs a state that an order is given in a barber as a present state of use, and Place (Barber), Opportunity (Order) are recognized as a state of use by the state of use recognizing unit 503 (step S901).

Next, when the user inputs Japanese C202 of FIG. 2 that means "A haircut, please." as a source language sentence, the input accepting unit 101 accepts the input of the source language sentence (step S902). Next, the source language analyzing unit 102 analyzes the source language sentence and outputs (request,(motion, <cut, 1x000c75>, (subject, hair, 0x006166>))) (step S902) as a source language interpretation that is a result of the source language analysis (step S903).

The translation unit 108 outputs "A haircut, please" as a target language sentence that is a result of translation of the source language sentence (step S904). Further, the supplemental example sentence search unit 504 searches a supplemental example sentence that has the condition of a "condition" portion, which agrees with Place (Barber), Opportunity (Order) as the state of use, and has the condition of a "concept" portion, which agrees with (request,(motion, <cut, 1x000c75>, (subject, hair, 0x006166>))) as the source language interpretation from the supplemental example sentence storing unit 521 (step S905). As a result, the supplemental example sentences 201 and 202 shown in FIG. 3 are searched.

Since the supplemental example sentences are searched (step S906: Yes), the supplemental example sentence selecting unit 505 executes supplemental example sentence selection processing (step S907). Since the supplemental example sentences C203 and C204 of FIG. 2, which correspond to the entries of the source sentence columns of the supplemental example sentences 201 and 202, are not registered in the dialog history storing unit 522 shown in FIG. 8 (step S1001: No), the supplemental example sentences are not deleted.

Next, although the supplemental example sentence selecting unit 505 searches data corresponding to the type of speech "request" of the supplemental example sentences with reference to the level-of-importance table 523-*a* shown in FIG. 9, since no corresponding data exists, the supplemental example sentences are output without updating the levels of importance thereof (step S1003).

Next, the supplemental example sentence selecting unit 505 sets priority to the supplemental example sentences in the order of the levels of importance thereof (step S1004). As shown in FIG. 7, the level of importance '5' of the supplemental example sentence 602 is larger than the level of importance '3' of the supplemental example sentence 601, the priority of the supplemental example sentence 602 is set higher than that of the supplemental example sentence 601.

Next, although the supplemental example sentence selecting unit 505 determines the levels of importance of supplemental example sentences are set to 0 (step S1005), since there is no supplemental example sentence whose level of importance is set to 0 (step S1005: No), no supplemental example sentence is deleted.

As a result, the display control unit 107 displays the Japanese sentence C202 as the source language sentence, the result of translation "A haircut, please.," and supplemental example sentences C203 and C204 of FIG. 2, which correspond to the entries of the source sentence columns of the supplemental example sentences 201 and 202, on the supplemental example sentence display screen (step S908). At the time, the supplemental example sentence C204 having a larger level of importance is displayed at an uppermost position.

Thereafter, when the supplemental example sentence C204 is designated on the supplemental example sentence display screen as a supplemental example sentence used by the user (S910), the output unit 109 synthesizes the target language sentence "A haircut, please.," which is translated by the translation unit 108, and the entry of the translated sentence "A shampoo, please." of the supplemental example sentence, which is stored in the supplemental example sentence storing unit 521, to a speech of English as the target language and outputs the speech as a result of synthesis (Step S911).

As described above, in the communication supporting apparatus 500 according to the second embodiment, supplemental example sentences can be presented by searching supplemental example sentences according to a state of use as well as rearranging and deleting the searched supplemental example sentences according to personal information such as the preference and the like inherent to the user and the dialog history. Accordingly, even if a display region is limited, supplemental example sentences can be easily designated, and the contents intended by the user can be more properly transmitted.

A communication supporting apparatus according to a third embodiment includes a storing unit for storing a hierarchy relation of concepts shown by the semantic content of a word and outputs a supplemental example sentence according to the information inherent to the user by replacing a concept included in the supplemental example sentence with the personal information of a subordinate concept.

Figure 12:
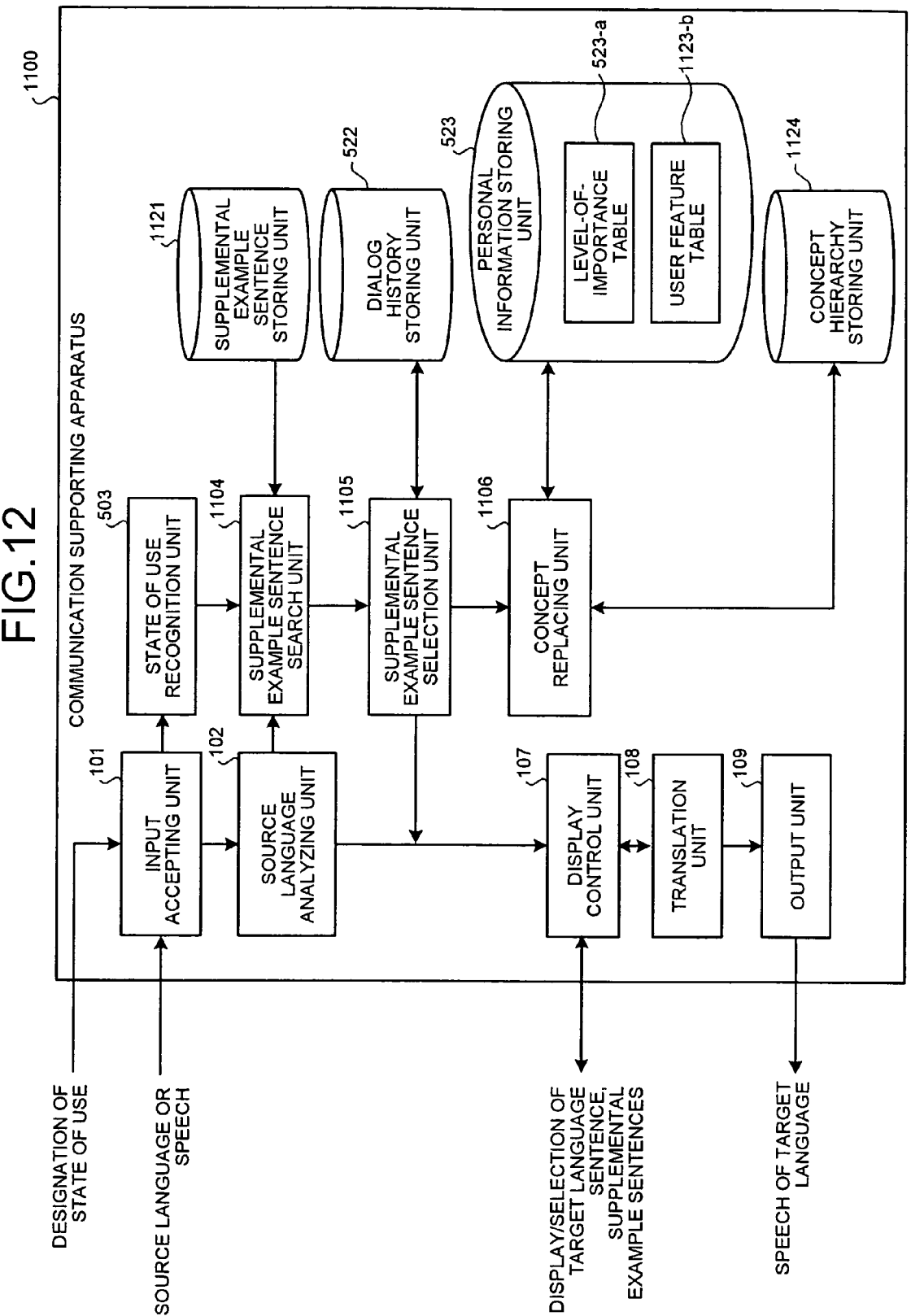
FIG. 12 is a block diagram showing a configuration of a communication supporting apparatus according to a third embodiment.

FIG. 12 is a block diagram showing a configuration of the communication supporting apparatus 1100 according to a third embodiment. As shown in FIG. 12, the communication supporting apparatus 1100 includes an input accepting unit 101, a source language analyzing unit 102, a state-of-use recognizing unit 503, a supplemental example sentence search unit 1104, a supplemental example sentence selecting unit 1105, a concept replacing unit 1106, a display control unit 107, a translation unit 108, an output unit 109, a supplemental example sentence storing unit 1121, a dialog history storing unit 522, a personal information storing unit 1123, and a concept hierarchy storing unit 1124.

The third embodiment is different from the second embodiment in that the concept replacing unit 1106 and the concept hierarchy storing unit 1124 are additionally provided and that the functions of the supplemental example sentence search unit 1104 and the supplemental example sentence selecting unit 1105 and the data structures of the supplemental example sentence storing unit 1121 and the personal information storing unit 1123 are different from those of the second embodiment. Since the other configurations and functions of the third embodiment are the same as those shown in the block diagram of FIG. 6 showing the configuration of the communication supporting apparatus 500 according to the second embodiment, the same components are denoted by the same reference numerals and the explanation thereof is not repeated.

The supplemental example sentence storing unit 1121 stores a source language interpretation, a condition of use, and a supplemental example sentence as an example of a sentence for supporting the semantic content represented by the source language interpretation in correspondence to each other.

FIG. 13 is a view explaining an example of a data structure of the supplemental example sentence storing unit 1121. As shown in FIG. 13, the supplemental example sentence storing unit 1121 of the third embodiment is different from the supplemental example sentence storing unit 521 of the second embodiment in that the supplemental example sentence storing unit 1121 may include an editable variable portion in the entry of a source sentence and the entry of a translated sentence.

As shown in FIG. 13, the entry of the source sentence is composed of the editable variable portion 1210 put in symbols '<<' and '>>' and an uneditable fixed portion as an ordinary language representation other than the symbols '<<' and '>>'. Note that the entry of the source sentence may not include the editable variable portion. The variable portion shown by the symbols '<<' and '>>' is composed of a variable identification number for uniquely identifying the position of the variable portion, a variable feature name showing the name of a feature that is caused to correspond to the variable portion, and a variable feature value as a specific value of the feature. Further, the variable feature value is composed of a variable feature value entry showing the name thereof and a variable feature value concept symbol for uniquely identifying the variable feature value, and the variable portion is described by a format of [variable feature name: variable feature value entry: variable feature value concept symbol].

The feature is a breakpoint for classifying the information as to the user such as the characteristics, preference and the like of the user, and, for example, "nationality," "allergy," "previous disease," "credit card," "household medicine," and the like are set as the feature. However, the feature is not limited thereto, and any breakpoint may be set as the feature as long as it classifies the information as to the user.

The variable feature value is a concept for specifically showing the feature, and a value, which corresponds to the superordinate concept of the concepts showing the characteristics of respective users, is set as the variable feature value. When, for example, the variable feature name is "allergy," "food" may be set as the variable feature value. This is because "food" corresponds to the superordinate concept of "egg," "milk" and the like which cause allergy to the respective users and can be replaced according to the personal information of the user. Processing for replacing the concept will be explained below in detail.

Further, as shown in FIG. 13, the entry of the translated sentence is composed of an editable variable portion 1211 put in symbols '<<' and '>>' and an uneditable fixed portion as an ordinary language representation other than the symbols '<<' and '>>'. Note that the entry of the translated sentence may not include the editable variable portion. The variable portion 1211 is a portion corresponding to the variable portion 1210 of the entry of the source sentence and describes a variable identification number for uniquely identifying the position of the variable portion 1210 of the entry of the source sentence. A sentence translated from the variable portion 1210 of the entry of the source sentence is inserted into the variable portion 1211.

The personal information storing unit 1123 stores personal information as information as to the user and is different from the personal information storing unit 523 of the second embodiment in that it stores a user feature table 1123-b in addition to a level-of-importance table 523-a.

The user feature table 1123-b is referred to when the concept replacing unit 1106 updates the feature value of a supplemental example sentence searched from the supplemental example sentence storing unit 1121 according to user feature values set to respective individuals. Processing for replacing a concept will be explained below in detail.

FIG. 14 is a view explaining an example of a data structure of the user feature table 1123-b. As shown in FIG. 14, the user feature table 1123-b stores a feature name 1301 and a feature value 1302 of a user feature in correspondence to each other.

The feature name of the user feature is a name showing a feature of the user, and the feature value of the user feature is a concept for specifically showing the feature of the user and set to a value of a feature corresponding to a subordinate concept of the variable feature value described above.

The feature value is described in a format of "<entry word, concept symbol>" using a combination of an entry word showing the name and a concept symbol for uniquely identifying the feature value. Further, a plurality of the feature values may be set to one feature name. As shown in, for example, FIG. 14, two feature values, that is, "<egg, 0x0ef00d>" and "<tick, 0x126400>" may be set to the feature name 1303 of "allergy" as the feature value of the user feature.

The concept hierarchy storing unit 1124 stores the hierarchy relation of a concept shown by the semantic content of a word and can be composed of any storing unit that is used ordinarily such as an HDD, an optical disc, a memory card, and the like. The concept hierarchy storing unit 1124 is referred to in order to confirm the hierarchy relation between concepts when the concept replacing unit 1106 to be described later replaces the concept of the variable portion in a supplemental example sentence with a concept shown by a feature value of the user stored in the user feature table 1123-b. Processing for replacing the concept will be explained below in detail.

Figure 15:
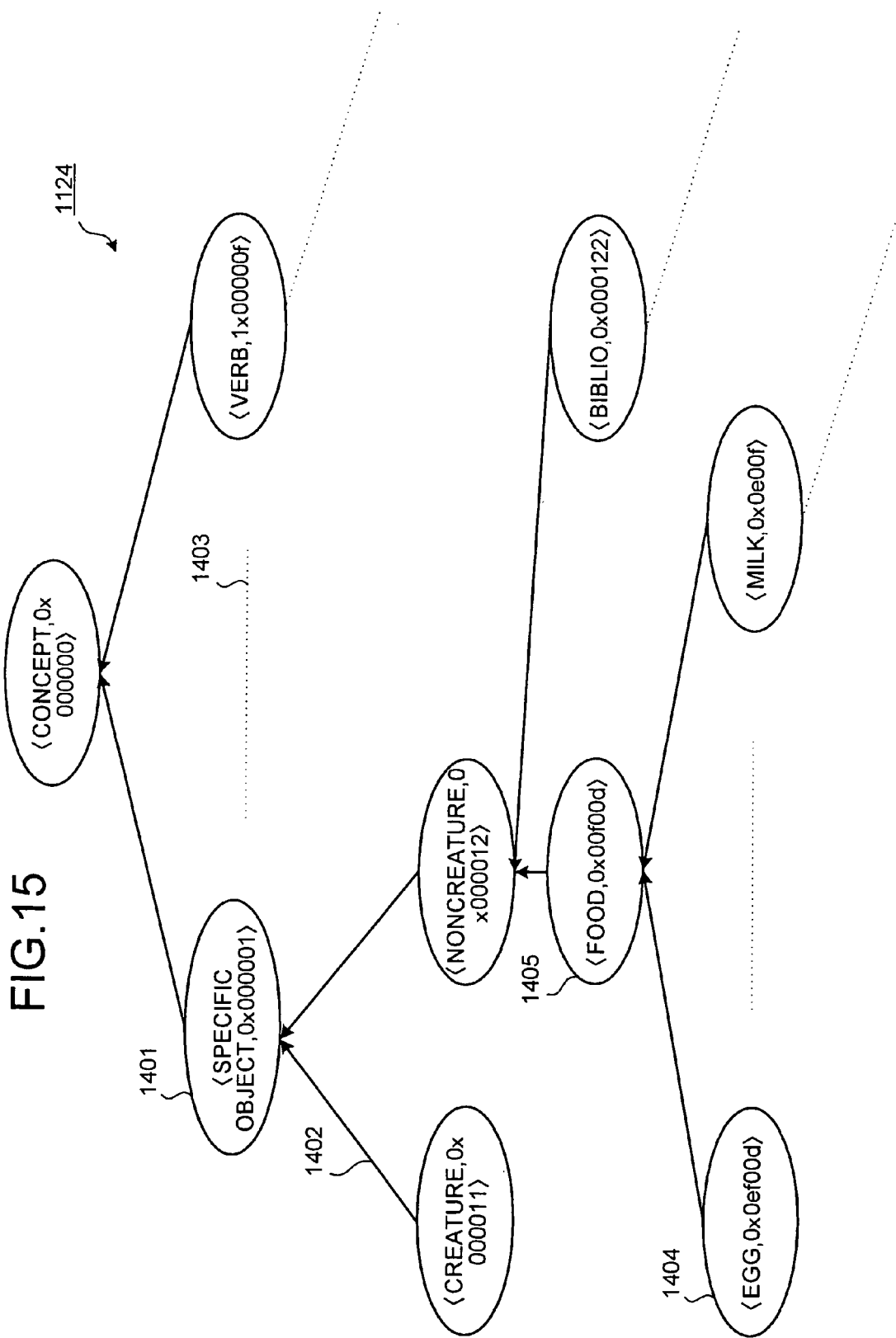
FIG. 15 is a view explaining an example of a data structure of a concept hierarchy storing unit.

FIG. 15 is a view explaining an example of a data structure of the concept hierarchy storing unit 1124. As shown in FIG. 15, the concept hierarchy storing unit 1124 is shown by elliptic nodes 1401 each of which shows one concept and directional graphs 1402 each of which faces a single direction. The node is described in a format of "<entry word, concept symbol>" using a combination of the entry word of a concept shown by the node and a concept symbol. The concept symbol is used to uniquely identify the concept of the entry thereof, and, when a plurality of concepts exist to one entry, a plurality of concept symbols may be allocated to the one entry.

For example, a node 1404 shows a concept whose entry is "egg" and which has a concept symbol of "0x0ef00d" corresponding to "egg." Further, one directional graph shows a relation between concepts shown by two nodes connected by the one directional graph, which means that the terminal point of the arrow shows a superordinate concept of the start point thereof. For example, the superordinate concept of the node 1404 whose the entry is shown by "egg" and whose concept symbol is shown by "0x0ef00d" is a node 1405 whose entry is shown by "food" and whose concept symbol is shown by "0x00f00d". Note that dotted lines 1403 of FIG. 15 are symbols which are omitted for the convenience of the sheet.

The supplemental example sentence search unit 1104 searches corresponding supplemental example sentences from the supplemental example sentence storing unit 1121 using a source language interpretation output from the source language analyzing unit 102 and a state of use recognized by the state of use recognizing unit 503 as a search key likewise the supplemental example sentence search unit 504 of the second embodiment. At the time, when the concept of a word included in a "concept" portion of the condition of a supplemental example sentence stored in the supplemental example sentence storing unit 1121 is the superordinate concept of a concept included in the source language interpretation with reference to the concept hierarchy storing unit 1124, the word may be searched as a candidate of the supplemental example sentences.

When, for example, the user inputs Japanese C205 of FIG. 2, which means "A spaghetti, please." as the source language sentence, (request(motion, <order, 1x0f00ab>, (subject, <spaghetti, 0x2ff0a0>))) is obtained as the source language interpretation. At the time, the supplemental example sentence search unit 1104 may search not only a supplemental example sentence 1202 in FIG. 13 having the "concept" portion that completely agrees with the source language interpretation but also supplemental example sentences 1201 and 1203 in FIG. 13 each having the "concept" portion (request (motion, <order, 1x0f00ab>, (subject, <cuisine, 0x0ff0a0>)))) whose subject is replaced with "cuisine" as the superordinate concept of "spaghetti."

The supplemental example sentence selecting unit 1105 refers to the feature value of a user feature stored in the user feature table 1123-b in addition to the level of importance stored in the level-of-importance table 523-a and the dialog history stored in the dialog history storing unit 522 and selects a supplemental example sentence from the supplemental example sentences searched by the supplemental example sentence search unit 1104 of the level of importance, the dialog history, and the feature value of the user feature. As described above, the supplemental example sentence selecting unit 1105 of the third embodiment is different from the supplemental example sentence selecting unit 505 of the second embodiment in that the supplemental example sentence is searched additionally with reference to the feature value of the user feature.

Specifically, the supplemental example sentence selecting unit 1105 has such a function that when the feature value of the user feature corresponding to the subordinate concept of the variable portion included in a searched supplemental example sentence cannot be obtained from the user feature table 1123-b, the supplemental example sentence is deleted, in addition to the function of the supplemental example sentence selecting unit 505 of the second embodiment.

Accordingly, a supplemental example sentence can be presented according to the preference and the characteristics of the user as well as there can be reduced a possibility of occurrence of a problem in that the user cannot designate a proper supplemental example sentence because unnecessary supplemental example sentences are presented and thus the contents intended by the user cannot be sufficiently transmitted.

When the supplemental example sentence, which is searched by the supplemental example sentence search unit 1104 and selected by the supplemental example sentence selecting unit 1105, includes a variable portion, the concept replacing unit 1106 confirms whether or not the feature value of a user feature corresponding to the subordinate concept of a concept shown by the variable portion exists in the user feature table 1123-b. When the feature value exists in the user feature table 1123-b, the concept replacing unit 1106 replaces the variable portion of the supplemental example sentence with the feature value of the user feature.

The relation between concepts is confirmed with reference to the concept hierarchy storing unit 1124 described above. When, for example, the concept hierarchy as shown in FIG. 15 is stored in the concept hierarchy storing unit 1124, "food" exists in the variable portion of the supplemental example sentence, and "egg" exists in the feature value of a user feature, the concept replacing unit 1106 can reach the node 1404 corresponding to "egg" by tracing a directional graph toward a subordinate direction from the node 1405 corresponding to "food", thereby it is determined that the concept of "egg" is the subordinate concept of the concept of "food."

Next, communication support processing executed by the communication supporting apparatus 1100 of the third embodiment configured as described above will be explained. In the third embodiment, the contents of supplemental example sentence selection processing shown at step S907 of FIG. 10 are different from those of the second embodiment. Since the overall flow of the communication support processing other than the above is the same as that of the second embodiment shown in FIG. 10, the explanation thereof is not repeated.

FIG. 16 is a flowchart showing an overall flow of the supplemental example sentence selection processing in the third embodiment. Since dialog history confirmation processing and level of importance update/determination processing from steps S1501 to S1505 are the same as those from steps S1001 to S1005 in the communication supporting apparatus 500 of the second embodiment, the explanation thereof is not repeated.

When it is determined at step S1505 that the level of importance of a supplemental example sentence is 0 (step S1505: Yes), the supplemental example sentence selecting unit 1105 deletes the supplemental example sentence (step S1510).

When it is determined that the level of importance of the supplemental example sentence is not 0 (step S1505: No), the supplemental example sentence selecting unit 1105 determines whether or not the supplemental example sentence includes a variable portion (step S1506). When the supplemental example sentence does not include the variable portion (step S1506: No), the supplemental example sentence selecting unit 1105 determines whether or not all the supplemental example sentences are processed (step S1511).

When the supplemental example sentence includes the variable portion (step S1506: Yes), the concept replacing unit 1106 confirms the hierarchy relation between the concept of the feature value of the user feature and the concept of the variable portion with reference to the user feature table 1123-*b* of the personal information storing unit 1123 and the concept hierarchy storing unit 1124 (step S1507).

Next, the concept replacing unit 1106 determines whether or not the feature value of the user feature, which corresponds to the subordinate concept of the concept of the variable portion, exists (step S1508). When the feature value exists (step S1508: Yes), the concept replacing unit 1106 creates a supplemental example sentence whose variable portion is replaced with the feature value of the user feature (step S1509).

Note that, although the feature value of the user feature must be translated to a target language to create a sentence translated to the target language of the supplemental example sentence, the translation processing can be executed by the translation unit 108 described above. Further, the translated feature value of the user feature may be previously stored in the user feature table 1123-*b* and the translated sentence of the supplemental example sentence may be created by replacing the variable portion of the entry of the translated supplemental example sentence with the translated feature value.

When it is determined at step S1508 that the feature value of the user feature, which corresponds to the subordinate concept of the concept of the variable portion, does not exist (step S1508: No), the supplemental example sentence selecting unit 1105 deletes the supplemental example sentence (step S1510). Next, the supplemental example sentence selecting unit 1105 determines whether or not all the supplemental example sentences are processed (step S1511). When all the supplemental example sentences are not processed (step S1511: No), the process returns to the level of importance determination processing and repeats the processing (step S1505). When all the supplemental example sentences are processed (step S1511: Yes), the supplemental example sentence selection processing is ended.

Next, a specific example of the communication support processing of the third embodiment will be explained. It is assumed here that a dialog history as shown in FIG. 8 is registered to the dialog history storing unit 522, the levels of importance as shown in FIG. 9 are registered to the level-of-importance table 523-*a*, the supplemental example sentences as shown in FIG. 13 are registered to the supplemental example sentence storing unit 1121, the user features as shown in FIG. 14 are registered to the user feature table 1123-*b*, and the concept hierarchy as shown in FIG. 15 is registered to the concept hierarchy storing unit 1124.

First, the user inputs a state that an order is given in a restaurant as a present state of use, and Place (Restaurant), Opportunity (Order) are recognized by the state of use recognizing unit 503 as the state of use (step S901).

Next, when the user inputs a Japanese sentence C206 of FIG. 2 that means "Carbonara, please." as a source language sentence, the input accepting unit 101 accepts the input of the source language sentence (step S902). Next, the source language analyzing unit 102 analyzes the source language sentence and outputs(request,(motion, <order, 1x0f00ab>, (subject, spaghetti, 0x2ff0a0>))) as a source language interpretation that is a result of the source language analysis (step S903).

The translation unit 108 outputs "Carbonara, please." as a target language sentence that is a result of translation of the source language sentence (step S904). Further, the supplemental example sentence search unit 1104 searches a supplemental example sentence that has the condition of a "condition" portion, which agrees with Place (Restaurant), Opportunity (Order) as the state of use, and has the condition of a "concept" portion, which agrees with (request,(motion, <order, 1x0f00ab>, (subject, <spaghetti, 0x2ff0a0>))) as the source language interpretation from the supplemental example sentence storing unit 1121 (step S905). At the time, a supplemental example sentence that has the condition of a "concept" portion, which agrees with a source language interpretation (request,(motion, <order, 1x0f00ab>, (subject, <cuisine, 0x2ff0a0>))) in which the concept "spaghetti" is replaced with a superordinate concept "cuisine" is also searched. As a result, three supplemental example sentences 1201, 1202, and 1203 shown in FIG. 13 are searched.

Since the supplemental example sentences are searched (step S906: Yes), supplemental example sentence selection processing is executed by the supplemental example sentence selecting unit 1105 (step S907). Since the same dialog contents as the supplemental example sentences 1201, 1202, and 1203 are not registered in the dialog history storing unit 522 shown in FIG. 8 (step S1501: No), the supplemental example sentences are not deleted.

Next, the supplemental example sentence selecting unit 1105 search data corresponding to the types of speech of the respective supplemental example sentences with reference to the level-of-importance table 523-*a* shown in FIG. 9. Since there exists data corresponding to the type of speech "disease" of the supplemental example sentence 1201 and to the type of speech "quantity" of the supplemental example sentence 1202, the supplemental example sentences are output after the levels of importance thereof are updated to 10 and 0, respectively (step S1503). Note that there does not exist data corresponding to the type of speech "like/dislike", "request" of the supplemental example sentence 1203 in the level-of-importance table 523-*a*, the supplemental example sentence 1203 is output without updating the level of importance thereof.

Next, the supplemental example sentence selecting unit 1105 sets priority to the supplemental example sentences in the order of the levels of importance thereof (step S1504). The priority is given in the order of the supplemental example sentence 1201 (level of importance: 10), the supplemental example sentence 1203 (level of importance: 3), and the supplemental example sentence 1202 (level of importance: 0) according to a result of update.

Next, the supplemental example sentence search unit 1105 determines whether or not the levels of importance of the supplemental example sentences are 0 (step S1505). Since the level of importance of the supplemental example sentence 1202 is 0 (step S1005: Yes), the supplemental example sentence 1202 is deleted. Since the levels of importance of the other supplemental example sentences are not 0, processings at step S1506 and subsequent steps are executed.

FIG. 17 is a view explaining the supplemental example sentences shown in FIG. 13 after the priority is given thereto and the supplemental example sentence whose level of importance is 0 is deleted. As shown in FIG. 17, the supplemental example sentences 1201 and 1203 of FIG. 13 are selected by the processings executed up that time.

Next, the supplemental example sentence selecting unit 1105 determines whether or not the supplemental example sentences include a variable portion (step S1506). Since both the supplemental example sentences 1201 and 1203 include the variable portion (step S1506: Yes), the concept replacing unit 1106 confirms whether or not the feature value of a user feature that corresponds to the subordinate concept of the variable portion exists with reference to the user feature table 1123-*b* (step S1507).

As to the supplemental example sentence 1201, the feature value "egg" relating to the feature name "allergy" of a user feature exists in the user feature table 1123-*b* shown in FIG. 14 in correspondence to the variable feature value "food" as to the variable feature name "allergy" (step; S1508: Yes). Accordingly, the concept replacing unit 1106 creates a supplemental example sentence by replacing "food" with "egg" (step S1509).

The supplemental example sentence 1203 is deleted the supplemental example sentence search unit 1105 because the feature name "dislike" of a user feature does not exist in the user feature table 1123-*b* shown in FIG. 14 in correspondence to the variable feature name "dislike" (step S1508: No).

Accordingly, the supplemental example sentence 1201 is selected as a final supplemental example sentence. FIG. 18 is a view explaining an example of the supplemental example sentence at the time. As shown in FIG. 18, a supplemental example sentence 1701 is selected which is created by replacing the variable portion of the supplemental example sentence shown in FIG. 13 and changing the entry of the source sentence to a Japanese sentence C207 of FIG. 2 that means "Egg is used in this dish?"

As a result, the display control unit 107 displays the Japanese sentence C206 as the source language sentence, "Carbonara, please." as a result of translation of the source language sentence, the Japanese sentence C207 as the supplemental example sentence, and the entry of the translated sentence of the supplemental example sentence "Egg is used in this dish?" on the supplemental example sentence display screen (step S908).

Thereafter, the output unit 109 synthesizes the result of translation of the source language sentence "Carbonara, please." and the entry of the translated sentence of the supplemental example sentence "Egg is used in this dish?" to a speech using English as the target language and outputs a result of synthesis (step S911).

As described above, in the third embodiment, communication can be supported by creating a supplemental example sentence by reflecting the preference of a user and restrictions and outputting a speech together with a result of translation of a source language sentence.

Next, another specific example of the communication support processing of the third embodiment will be explained. FIG. 19 is a view explaining an example of a supplemental example sentence stored in the supplemental example sentence storing unit 1121 in the example. Note that it is assumed that the same information as that of the example described above is stored in the respective storing unit except that supplemental example sentences as shown in FIG. 19 are stored in the supplemental example sentence storing unit 1121.

First, the user inputs a state that symptom is explained in a hospital as a present state of use, and Place (Hospital), Opportunity (symptom-explain) are recognized by the state-of-use recognizing unit 503 (step S901) as the state of use.

Next, when the user inputs a Japanese sentence C208 of FIG. 2 that means "How should I take this medicine?" as a source language sentence, the input accepting unit 101 accepts the input of the source language sentence (step S902). Next, the source language analyzing unit 102 analyzes the source language sentence and outputs (query, (method, <how, 4x001030>, (motion, <take, 1x0d611c>, (subject, <medicine, 0x1d6a1c>)))(step S903) as a source language interpretation that is a result of analysis of the source language.

The translation unit 108 outputs "How should I take this medicine?" as a target language sentence that is a result of translation of the source language sentence (step S904). Further, the supplemental example sentence search unit 1104 searches a supplemental example sentence that has the condition of a "condition" portion, which agrees with Place (Hospital), Opportunity (symptom-explain) as the state of use, and has the condition of a "concept" portion, which agrees with (query, (method, <how, 4x001030>, (motion, <take, 1x0d611c>, (subject, <medicine, 0x1d6a1c>))) as the source language interpretation from the supplemental example sentence storing unit 1121 (step S905). As a result, two supplemental example sentences 1801 and 1802 shown in FIG. 19 are searched.

Since the supplemental example sentences are searched (step S906: Yes), supplemental example sentence selection processing is executed by the supplemental example sentence selecting unit 1105 (step S907). Since the same dialog contents as the supplemental example sentences 1801 and 1802 are not registered in the dialog history storing unit 522 shown in FIG. 8 (step S1501: No), the supplemental example sentences are not deleted.

Next, the supplemental example sentence selecting unit 1105 searches data corresponding to the types of speech of the respective supplemental example sentences with reference to the level-of-importance table 523-*a* shown in FIG. 9. Since there exists data corresponding to the type of speech "disease" of the supplemental example sentence 1801, the supplemental example sentence is output after the level of importance thereof is updated to 10 (step S1503). Note that there does not exist data corresponding to the type of speech "medicine" of the supplemental example sentence 1802 in the level-of-importance table 523-*a*, the supplemental example sentence 1802 is output without updating the level of importance thereof.

Next, the supplemental example sentence selecting unit 1105 sets priority to the supplemental example sentences in the order of the levels of importance thereof (step S1504). The priority is given in the order of the supplemental example sentence 1801 (level of importance: 10) and the supplemental example sentence 1802 (level of importance: 9) according to a result of update.

Next, although the supplemental example sentence selecting unit 1105 determines whether or not the level of importance of supplemental example sentences is set to zero (step S1505), since there is no supplemental example sentence whose level of importance is set to zero (step S1005: No), no supplemental example sentence is deleted.

Next, the supplemental example sentence selecting unit 1105 determines whether or not the supplemental example sentences include a variable portion (step S1506). Since both the supplemental example sentences 1801 and 1802 include the variable portion (step S1506: Yes), the concept replacing unit 1106 confirms whether or not the feature value of a user feature that corresponds to the subordinate concept of the variable portion exists with reference to the user feature table 1123-*b* (step S1507).

As to the supplemental example sentence 1801, the feature values "cardiac disease" and "diabetes" relating to the feature name "previous disease" of a user feature exists in the user feature table 1123-*b* shown in FIG. 14 in correspondence to the variable feature value "name of disease" relating to the variable feature name "previous disease" (step; S1508: Yes). Accordingly, the concept replacing unit 1106 creates two supplemental example sentences by replacing "name of disease" with "cardiac disease" and "diabetes."

As to the supplemental example sentence 1802, the feature name "medicine" of the user feature exists in the user feature table 1123-*b* in correspondence to the variable feature name "household medicine" (step S1508: Yes). Accordingly, the concept replacing unit 1106 creates a supplemental example sentence by replacing "household medicine" with "aspirin" (step S1509).

As described above, the three supplemental example sentences are finally output from the concept replacing unit 1106. FIG. 20 is a view explaining examples of the supplemental example sentences at the time. As shown in FIG. 20, the supplemental example sentences 1901 and 1902, in which the variable portion of the supplemental example sentence 1801 shown in FIG. 19 is replaced, and the supplemental example sentence 1903, in which the variable portion of the supplemental example sentence 1082 is replaced, are output.

As a result, the display control unit 107 displays Japanese C208 as the source language sentence, the result of translation "How should I take this medicine?" and supplemental example sentences C209, C210, and C211 of FIG. 2, which correspond to the entries of the source sentence columns of the supplemental example sentences 1901, 1902, and 1903, on the supplemental example sentence display screen (step S908).

Thereafter, when the supplemental example sentence C211 is designated on the supplemental example sentence display screen as a supplemental example sentence used by the user (step S910), the output unit 109 synthesizes the result of translation of the source language sentence "How should I take this medicine" and the translated entry of the supplemental example sentence "I've taken aspirin" to a speech using English as the target language and outputs a result of synthesis (step S911).

As described above, since supplemental example sentences are created by reflecting the preference of a user and restrictions and all the supplemental items to be spoken are recited, the user can be made aware of the contents that are not spoken. Further, since the speech contents relating to the history of speech and to the personal information of the user are additionally presented without the need of re-inputting them by the user, speech can be simply input, thereby the user can communicate with a dialog opponent promptly and smoothly.

As described above, in the communication supporting apparatus 1100 according to the third embodiment, a supplemental example sentence is searched according to a state of use as well as, when the searched supplemental example sentence includes a variable portion described by a superordinate concept, the variable portion can be replaced with a subordinate concept using personal information stored in the storing unit. Accordingly, a supplemental example sentence can be presented according to the preference and the characteristics of the user, thereby communications can be supported in various states.

Note that it is assumed that all the communication supporting apparatuses of the first to third embodiments are used individually, a plurality of communication supporting apparatuses may be connected to each other by providing them with communication units so that they share supplemental example sentences therebetween.

For example, a supplemental example sentence may be searched from a supplemental example sentence storing unit disposed to a shared server connected to a network such as the Internet and the like by executing communication through the shared server and the communication sections. At the time, the levels of importance of supplemental example sentences may be updated based on the levels of importance set by respective users and on the frequencies of use of the respective supplemental example sentences. Further, there may be provided a function for permitting the respective users to correct the supplemental example sentences of the shared server to more proper example sentences with reference to the supplemental example sentences corrected by them. More proper supplemental example sentences can be presented by providing the learning function of the supplemental example sentences even if a culture and customs are changed by a trend. The communication method is not limited to the one described above and may be variously modified depending on a technical scope, and users may directly communicate with each other through, for example, the terminals thereof.

It should be noted that the communication support program executed by the communication supporting apparatuses of the first to third embodiments is provided by being previously assembled in a ROM (read only memory) and the like.

The communication support program executed by the communication supporting apparatuses of the first to third embodiments may be provided as an installable or executable file by being recorded to a computer-readable recording medium such as a CD-ROM (compact disc read only memory), flexible disc (FD), CD-R (compact disc recordable), DVD (digital versatile disc), and the like.

The communication support program executed by the communication supporting apparatuses of the first to third embodiments may be provided by being stored in a computer connected to the network such as the Internet and the like and downloaded through the network. Further, the communication support program executed by the communication supporting apparatuses of the first to third embodiments may be provided or circulated through the network such as the Internet and the like.

The communication support program executed by the communication supporting apparatuses of the first to third embodiments is composed of a module including the respective sections described above (input accepting unit, source language analyzing unit, state of use recognizing unit, supplemental example sentence search unit, supplemental example sentence selecting unit, concept replacing unit, display control unit, translation unit, and output unit), and the respective sections are loaded on a CPU (central processing unit) as actual hardware by reading and executing the communication support program from the ROM, thereby the respective sections are created on the CPU.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication supporting apparatus, comprising:
a supplemental example storing unit that stores a source language interpretation which is an interpretation of a semantic content of a source language sentence to be translated, and a supplemental example sentence, in association with each other, the supplemental example sentence being an example of a sentence for supplementing an intention of a user that is not expressed in the source language sentence and being different from the source language sentence;
an input accepting unit that accepts the source language sentence input by a user;

an analyzing unit that analyzes the semantic content of the source language sentence and outputs the source language interpretation;

a search unit that searches for the supplemental example sentence associated with the source language interpretation from the supplemental example storing unit; and a translation unit that translates the source language sentence and the supplemental example sentence into a target language;

a personal information storing unit that stores personal information of a user including information in which contents to be spoken are associated with a level of importance indicating a level of interest of the user to the contents to be spoken;

a dialog history storing unit that stores a history of dialog spoken by the user;

a recognizing unit that recognizes a state of use that is information showing a state in which the user has a dialog; and a selecting unit that selects a supplemental example sentence based on at least one of the level of importance included in the personal information and the history of dialog, wherein the supplemental example storing unit stores the state of use, the source language interpretation and the supplemental example sentences in association with each other;

the search unit searches for a supplemental example sentence, which is associated with the source language interpretation and the state of use, from the supplemental example storing unit; and the translation unit translates the selected supplemental example sentence.

2. The communication supporting apparatus according to claim 1, further comprising:

a concept hierarchy storing unit that stores a hierarchy relation of a concept represented by the semantic content of a word; and a replacing unit that replaces the concept included in the supplemental example sentence with the personal information corresponding to a subordinate concept of the concept included in the supplemental example sentence based on the hierarchy relation and the personal information, wherein the translation unit translates the replaced supplemental example sentence and the source language sentence.

3. The communication supporting apparatus according to claim 1, wherein the state of use is input by the user through the input accepting unit.

4. The communication supporting apparatus according to claim 1, wherein the recognizing unit obtains position information of a place where the user makes a dialog, and recognizes the state of use based on the obtained position information.

5. The communication supporting apparatus according to claim 1, wherein the recognizing unit recognizes the state of use based on the contents spoken by the user.

6. The communication supporting apparatus according to claim 1, further comprising a display control unit that displays a supplemental example sentence to the user, and accepts a selection of the supplemental example sentence by the user.

7. The communication supporting apparatus according to claim 1, further comprising a display control unit that displays supplemental example sentences to the user in the order of the levels of higher importance, and causes the user to select a supplemental example sentence.

8. The communication supporting apparatus according to claim 1, wherein:

the input accepting unit recognizes the speech of a source language spoken by the user and accepts the input of the source language sentence as a result of recognition of the speech, and the communication supporting apparatus further comprises an output unit that outputs translations of the source language sentence and the supplemental example sentence in speech, respectively.

9. A communication supporting apparatus, comprising:

a supplemental example storing unit that stores a source language interpretation which is an interpretation of a semantic content of a source language sentence to be translated, and a supplemental example sentence which is an example of a sentence for supporting the semantic content, in association with each other;

an input accepting unit that accepts the source language sentence input by a user;

an analyzing unit that analyzes the semantic content of the source language sentence and outputs the source language interpretation;

a search unit that searches for the supplemental example sentence associated with the source language interpretation from the supplemental example storing unit;

a translation unit that translates the source language sentence and the supplemental example sentence into a target language;

a personal information storing unit that stores personal information of a user including information in which contents to be spoken are associated with a level of importance indicating a level of interest of the user to the contents to be spoken;

a dialog history storing unit that stores a history of dialog spoken by the user;

a recognizing unit that recognizes a state of use that is information showing a state in which the user has a dialog; and a selecting unit that selects a supplemental example sentence based on at least one of the level of importance included in the personal information and the history of dialog, wherein the supplemental example storing unit stores the state of use, the source language interpretation and the supplemental example sentences in association with each other;

the search unit searches for a supplemental example sentence, which is associated with the source language interpretation and the state of use, from the supplemental example storing unit; and the translation unit translates the selected supplemental example sentence and the source language sentence.

10. The communication supporting apparatus according to claim 9, further comprising:

a concept hierarchy storing unit that stores a hierarchy relation of a concept represented by the semantic content of a word; and a replacing unit that replaces the concept included in the supplemental example sentence with the personal information corresponding to a subordinate concept of the concept included in the supplemental example sentence based on the hierarchy relation and the personal information, wherein the translation unit translates the replaced supplemental example sentence and the source language sentence.

11. The communication supporting apparatus according to claim 9, wherein the state of use is input by the user through the input accepting unit.

12. The communication supporting apparatus according to claim 9, wherein the recognizing unit obtains position information of a place where the user makes a dialog, and recognizes the state of use based on the obtained position information.

13. The communication supporting apparatus according to claim 9, wherein the recognizing unit recognizes the state of use based on the contents spoken by the user.

14. The communication supporting apparatus according to claim 9, further comprising a display control unit that displays supplemental example sentences to the user in the order of the levels of higher importance, and causes the user to select a supplemental example sentence.

* * * * *